(12) United States Patent
Ogawa

(10) Patent No.: US 7,053,996 B2
(45) Date of Patent: May 30, 2006

(54) INSTRUMENTS OF OPTICAL PULSE CHARACTERIZATION

(75) Inventor: Kensuke Ogawa, Hachioji (JP)

(73) Assignee: Bussan Nanotech Research Institute, Inc., Tokyo (JP)

( * ) Notice: Subject to any disclaimer, the term of this patent is extended or adjusted under 35 U.S.C. 154(b) by 0 days.

(21) Appl. No.: 10/965,974

(22) Filed: Oct. 18, 2004

(65) Prior Publication Data

US 2005/0058449 A1    Mar. 17, 2005

Related U.S. Application Data

(62) Division of application No. 10/191,490, filed on Jul. 10, 2002, now Pat. No. 6,819,428.

(30) Foreign Application Priority Data

Jul. 12, 2001   (JP)   ............... 2001-212009

(51) Int. Cl.
  *G01N 21/00*   (2006.01)
(52) U.S. Cl. .................................. 356/73.1
(58) Field of Classification Search ............ 356/73.1, 356/521, 450–456; 398/158, 141, 81, 147, 398/149, 159, 209; 385/11, 24, 27, 123
  See application file for complete search history.

(56) References Cited

U.S. PATENT DOCUMENTS

| | | | |
|---|---|---|---|
| 3,749,497 A | 7/1973 | Kuzmin | |
| 5,530,544 A | 6/1996 | Trebino et al. | |
| 6,219,142 B1* | 4/2001 | Kane | ............ 356/450 |
| 2002/0018267 A1* | 2/2002 | Sun et al. | ............ 359/161 |
| 2002/0156592 A1* | 10/2002 | Taira et al. | ............ 702/66 |

OTHER PUBLICATIONS

"Measuring Ultrashort Laser Pulses in the Time-Frequency Domain Using Frequency-Resolved Optical Gating," R. Trebino et al., Rev. Sci. Instrum. 68(9), Sep. 1997, pp. 3278-3295.

"XFROG—A New Method for Amplitude and Phase Characterization of Weak Ultrashort Pulses," S. Linden et al., Phys. Stat. Sol. (b) 206, 119 (1998), pp. 119-124.

(Continued)

*Primary Examiner*—Tu T. Nguyen
(74) *Attorney, Agent, or Firm*—Birch, Stewart, Kolasch & Birch, LLP

(57) ABSTRACT

An optical transmission system is provided by preparing a two-photon transition medium where efficiency of two-photon transition does not depend on polarization; splitting an optical pulse to be measured into a probe optical pulse and a gate optical pulse by a polarization independent beam splitter; after adding variable delay time to this gate optical pulse, entering the probe optical pulse and the gate optical pulse into a highly efficient two-photon absorption medium so that both of the pulses cross each other, and thereby generating an optical gate function; resolving a spectrum of the transmitted probe optical pulse, and detecting the spectrum by a photodetector; and measuring intensity of electric-field absorption of the probe optical pulse as a function of delay time and a frequency.

6 Claims, 19 Drawing Sheets

OTHER PUBLICATIONS

"Recent Progress Toward Real-Time Measurement of Ultrashort Laser Pulses," D. Kane, IEEE Journal of Quantum Electronics, vol. 35, No. 4, Apr. 1999, pp. 421-431.

"High-Sensitivity Pulse Spectrogram Measurement Using Two-Photon Absorption in a Semiconductor at 1.5 um Wavelength," K. Ogawa et al., Optics Express, vol. 7, No. 1, Jul. 31, 2000, pp. 135-140.

"Improved Ultrashort Pulse-Retrieval Algorithm for Frequency-Resolved Optical Gating," K. Delong et al., 1994 Optical Society of America.

"Using Phase Retrieval to Mesure the Intensity and Phase of Ultrashort Pulses: Frequency-Resolved Optical Gating," R. Trebino et al., 1993 Optical Society of America.

* cited by examiner $$|A(f,\tau)| \propto S(f,\tau)$$
$$= |\int dt\, E_{probe}(t)\, I_{gate}(t-\tau)\, e^{-i2\pi ft}|$$

ALL POLARIZATIONS     0 DEGREE          90 DEGREE
                      POLARIZATION      POLARIZATION

INSTRUMENTS OF OPTICAL PULSE CHARACTERIZATION

CROSS-REFERENCE TO RELATED APPLICATION

This application is a Divisional of co-pending application Ser. No. 10/191,490 filed on Jul. 10, 2002, which has matured into U.S. Pat. No. 6,819,428, and for which priority is claimed under 35 U.S.C. § 120. The entire contents of the above-identified application is hereby incorporated by reference. This application also claims priority of Application No. 2001-212009 filed in Japan on Jul. 12, 2001 under 35 U.S.C. § 119.

BACKGROUND OF THE INVENTION

The present invention relates to a polarization-independent optical pulse characterization instrument which analyzes time and frequency (wavelength) properties of an optical pulse in an arbitrary polarized state.

As a technology for analyzing time and frequency properties of an optical pulse by measuring a spectrogram which is a function of delay time and a frequency (or a wavelength), a method called frequency-resolved optical gating (FROG) has been developed. Change with time or change with frequency (wavelength) in intensity and phase of an optical pulse to be measured can be obtained from a spectrogram. This technique is reported in the following documents: Review of Scientific Instruments, Vol. 68, No. 9, pp. 3277–3295, 1997; Physica Status Solidi (b) Vol. 206, pp. 119–124, 1998; and IEEE Journal of Quantum Electronics, Vol. 35, No. 4, pp. 421–431, 1999.

As a technology for characterizing a feeble ultrashort optical pulse with high sensitivity and high time resolution at the time of optical fiber transmission, FROG to which two-photon absorption in a semiconductor is applied as an optical gate has been developed. This technique is reported in Optics Express, Vol. 7, pp. 135–140, 2000. With this technique, the following method for measuring a spectrogram is disclosed: a probe optical pulse and a gate optical pulse in a linear polarization state, in which both of the optical pulses are orthogonal to each other, are colinearly entered in a two-photon absorption medium; and thereby a spectrogram is measured as a function of delay time between the gate optical pulse and the probe optical pulse, and as a function of a frequency or a wavelength.

In a long-distance optical fiber transmission system, it is expected that polarization mixing and polarization mode dispersion caused by double refraction in an optical fiber will exert a serious influence upon signal degradation. Therefore, characterization of the influence of polarization mixing and polarization mode dispersion in the optical fiber exerted upon ultrashort optical pulse transmission is indispensable for enhancing performance of the long-distance optical fiber transmission system which uses an ultrashort optical pulse. However, in the conventional method for characterizing an optical pulse using FROG which applies two-photon absorption in a semiconductor as an optical gate, an optical pulse to be measured and a gate optical pulse must always be in a linear polarization state. Therefore, the conventional method cannot be applied to an arbitrary polarized optical pulse. It is impossible to correctly characterize a randomly polarized optical pulse, and an optical pulse, a waveform of which is distorted, which are caused by polarization mixing and polarization mode dispersion.

An object of the present invention is to provide an optical transmission system, a signal error rate of which is low. Another object of the present invention is to provide an instrument of optical pulse characterization which is useful to provide such an optical system.

SUMMARY OF THE INVENTION

According to a first typical aspect of the present invention, there is provided an instrument of optical pulse characterization, wherein: analysis of optical pulse properties, resulting from polarization mode dispersion, becomes possible by the steps of: discriminating between an optical pulse to be measured and an optical pulse by four-wave mixing to eliminate noise generated by interference of the optical pulse to be measured with the optical pulse by four-wave mixing; and while measuring, with high sensitivity, a spectrogram of the optical pulse to be measured in an arbitrary polarized state, separating the spectrogram into two polarized components which are independent of, or orthogonal to, each other.

According to a second typical aspect of the present invention, there is provided an instrument of optical pulse characterization, wherein: said instrument of optical pulse characterization can select a method, measurement sensitivity of which is high, by selecting an optical pulse to be measured, intensity of which has been changed by two-photon absorption, and a third optical pulse generated by four-wave mixing, as objects to be measured.

An optical transmission system according to the present invention can be realized by using the above-mentioned instrument of optical pulse characterization.

To be more specific, according to a main mode of the present invention, a two-photon transition medium where efficiency of two-photon transition does not depend on polarization is prepared; and an optical pulse to be measured is split into the optical pulse to be measured itself (probe optical pulse) and a gate optical pulse by a polarization independent beam splitter. After adding variable delay time to this gate optical pulse, the probe optical pulse and the gate optical pulse are entered into a highly efficient two-photon absorption medium so that both of the pulses cross each other. Then, in a state in which a new optical pulse generated by four-wave mixing of the probe optical pulse and the gate optical pulse is spatially separated from the transmitted probe optical pulse itself so that both of the pulses are discriminated, an optical gate function is generated, and thereby a spectrum of the transmitted probe optical pulse, or of the optical pulse by four-wave mixing, is resolved before detecting the spectrum by a photodetector. By means of the optical detection, intensity of electric-field absorption of the optical pulse to be measured is measured as a function of delay time and a frequency. Thus, characterization by measuring time and frequency properties of the optical pulse to be measured in an arbitrary polarized state becomes possible.

Moreover, optical pulse characterization can also be achieved by the following steps: using an optical pulse to be measured as a probe optical pulse, and using an optical pulse independent of the optical pulse to be measured as a gate optical pulse; and entering both of the optical pulses into the two-photon transition medium described above. In this case, an optical pulse which is free from intensity distortion and phase distortion can be used as the gate optical pulse, which enables improvement in accuracy of measurement. Additionally, at the same time, a spectrogram of an optical pulse constituted of different wavelength components in wavelength-multiplexed communication can be measured collectively for a common gate optical pulse.

Furthermore, high-sensitivity optical pulse characterization becomes possible by the following steps: colinearly entering the probe optical pulse and the gate optical pulse into the two-photon transition medium; and utilizing a difference in beat frequency caused by interference with a reference optical pulse, a carrier frequency of which is different from that of the probe optical pulse, to discriminate between the optical pulse to be measured and the optical pulse by four-wave mixing.

According to a further aspect of the present invention, there is provided an optical communication system comprising: an optical transmission line through which an optical pulse propagates; an element for compensating chromatic dispersion or polarization mode dispersion; an element for extracting an optical pulse for characterization by diverting a part of optical power from the optical transmission line; an instrument of optical pulse characterization, which is connected to the element for extracting an optical pulse for characterization, according to any one of claim 2 through 8; and a control unit by which at least one of chromatic dispersion, and polarization mode dispersion, of the optical transmission line is measured by reading properties of a waveform of an optical pulse output from the instrument of optical pulse characterization, and thereby at least one of chromatic dispersion and polarization mode dispersion, which occur in the element for compensating at least one of chromatic dispersion and polarization mode dispersion, is controlled so that, for example, at least one of chromatic dispersion, and polarization mode dispersion, of the optical transmission line is minimized.

A still further aspect of an optical communication system according to the present invention relates to wavelength-multiplexed transmission.

To be more specific, it is an optical communication system comprising: an optical transmission line for wavelength-multiplexed transmission, through which a wavelength-multiplexed optical pulse is transmitted; an element for compensating at least one of chromatic dispersion, polarization mode dispersion, and propagation time between wavelength-multiplexed channels; an element for extracting an optical pulse for characterization by diverting a part of optical power from the optical transmission line; an instrument of optical pulse characterization, which is connected to the element for extracting an optical pulse for characterization, according to any one of claim 2 through 8; and a control unit by which from among chromatic dispersion, polarization mode dispersion, and crosstalk between wavelength-multiplexed channels, which occur in the optical transmission line, at least one of them is measured by reading properties of a waveform of an optical pulse output from the instrument of optical pulse characterization, and thereby at least one of chromatic dispersion, polarization mode dispersion, and crosstalk between wavelength-multiplexed channels, which occur in the element for compensating at least one of chromatic dispersion, polarization mode dispersion, and crosstalk between wavelength-multiplexed channels, is controlled so that, for example, from among chromatic dispersion, polarization mode dispersion, and crosstalk between wavelength-multiplexed channels, which occur in the optical transmission line, at least one of them is minimized.

BRIEF DESCRIPTION OF THE DRAWINGS

Other objects and advantages of the invention will become apparent from the following description of embodiments with reference to the accompanying drawings in which.

PREFERRED EMBODIMENTS OF THE INVENTION

Figure 1:
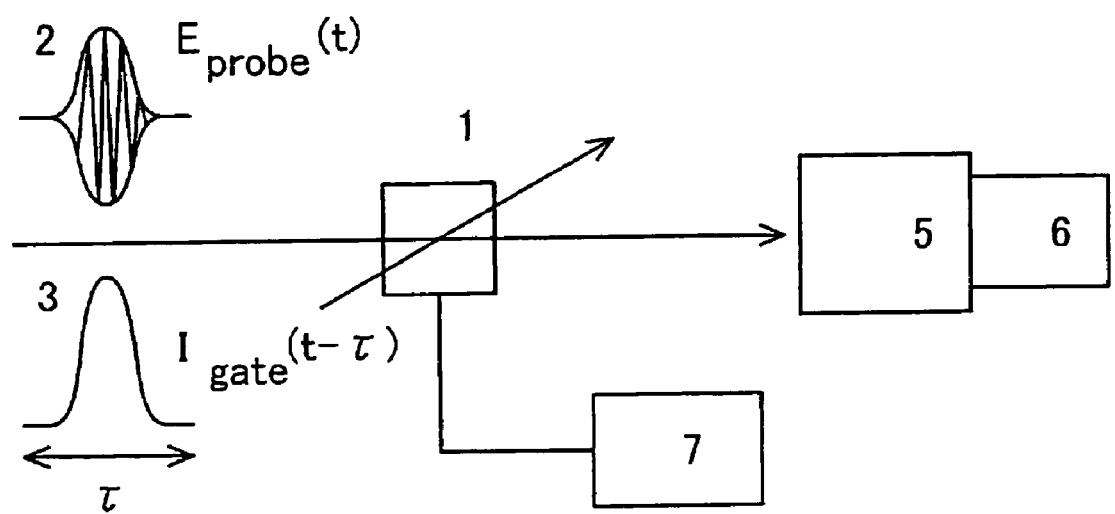
FIG. 1 is a schematic diagram illustrating operation principles of an instrument of optical pulse characterization according to the present invention.

To begin with, principles of the present invention will be described in detail, and then specific embodiments of the present invention will be described.

[Principles of Optical Pulse Characterization Using Two-photon Absorption Medium, which Underlies the Present Invention]

Characterization of an optical pulse being transmitted through an optical fiber and an optical pulse emitted by an ultrahigh-speed optoelectronic material/structure is indispensable to development of an ultrahigh-speed optical-fiber transmission system and an ultrahigh-speed optoelectronic element. The optical pulse is in a state in which amplitude of sine wave vibration of a light wave is not zero only during a limited period of time. Therefore, in order to characterize the optical pulse, it is necessary to determine the intensity and phase of the optical pulse. If a numerical formula is used, an electric field E(t) of an optical pulse can be expressed as a function of time t as below.

$$E(t) = |E(t)| \cdot e^{i\{-2\pi ft + \phi(t)\}} \quad (1)$$

where $|E(t)|$ is field intensity of an optical pulse, i is an imaginary unit, f is a frequency, and f(t) is a phase. Because characterization of the optical pulse is based on the formula (1), the characterization involves determination of $|E(t)|$ and f(t) and discussion about time dependency thereof. In the present invention, a distortionless optical pulse is defined as an optical pulse characterized by the following (i) and (ii): (i) As is the case with the Gauss function, $|E(t)|$ is symmetric with respect to time, and is unimodal; (ii) f (t) does not have time dependency, in other words, it is constant. In contrast with this, if the optical pulse has distortion, $|E(t)|$ is not symmetric, but has a number of peaks. Additionally, f(t) becomes time dependent, which is expressed by the following formula;

$$\phi(t) = \phi_0 + \phi^{(1)} \cdot t + \phi^{(2)} \cdot t^2 + \phi^{(3)} \cdot t^3 + \ldots + \phi_{SPM}(t) \quad (2)$$

where a first-order coefficient $f^{(o)}$ of t is group velocity; a coefficient of second or higher order $f^{(n)}$ is quantity relating to n-order group velocity dispersion; and $f_{SPM}(t)$ corresponds to a phase shift by self-phase modulation of the optical pulse. Usually, $f_{SPM}(t)$ is proportional to differentiation of $|E(t)|^2$. The larger these coefficients become, the larger distortion of the optical pulse becomes. Judging from the formulas (1) and (2), quantity values which should be determined to characterize the optical pulse are $|E(t)|$, $f^{(o)}$, $f^{(n)}$, and a proportional coefficient in $f_{SPM}(t)$.

If a time length of the optical pulse is shorter than 1 ps, that is to say, if its time scale is femtosecond (1 fs = $10^{-15}$ sec.), an electric measuring instrument into which a spectroscope and a high-speed photodetector are combined cannot cope with the time scale. For this reason, a spectrogram is measured from time and frequency resolution according to correlation between optical pulses; and using the spectrogram, the intensity and phase of the optical pulse to be measured are replicated by means of a rebuilding algorithm. This is an analysis technique used in FROG.

Conventionally, an optical gate function which is achieved by two-photon absorption requires optical pulse energy of about 100 nJ. However, selecting a material and a structure in response to a wavelength of a band to be measured enables realization of the optical gate function even for pulse energy of 100 fJ or less or peak power of 1 W or less.

Principles of measurement of an optical-pulse spectrogram on the basis of the optical gate function utilizing two-photon absorption will be described with reference to FIG. 1 as below.

Using a beam splitter, an optical pulse to be measured is separated into a probe optical pulse, which is an optical pulse to be measured, and a gate optical pulse. FIG. 1 is a diagram schematically illustrating a configuration of a device for measuring a spectrogram of a probe optical pulse.

A two-photon absorption medium 1 is used as a medium for generating an optical gate function which is a basic process of time and frequency resolution. Two-photon absorption is a nonlinear effect which is complementary to an optical Kerr effect, and this is a process which depends on an imaginary part of a nonlinear refractive index (the optical Kerr effect depends on its real part). The probe optical pulse 2 and the gate optical pulse 3 are entered into the two-photon absorption medium 1 so that both of the optical pulses cross each other. Here, an electric field of the probe optical pulse 2 is defined as $E_{probe}(t)$; and power of the gate optical pulse 3 is defined as I gate (t–τ). In this case, the first t represents time and the second t represents delay time. Timing of the gate optical pulse is swept with variable time delay. In the two-photon absorption medium 1, if there is a part where the probe optical pulse 2 overlaps with the gate optical pulse 3 with respect time, two-photon absorption occurs between both of the pulses, which results in decrease in transmission intensity of the probe optical pulse 2. Two-photon absorption power $P_{TPA}$ is expressed by a formula (3) as below.

$$P_{TPA} = \beta \cdot I_{gate} \cdot |E_{probe}|^2 \quad (3)$$

where b is two-photon absorption efficiency. It is to be noted that because an incidence plane and an emittance plane (transmission plane) in the two-photon absorption medium 1 is coated so as to achieve anti-reflection, it is assumed that interference caused by reflection and multiple reflection can be ignored. An optical pulse which is independent of an optical pulse to be measured can also be used As a gate optical pulse.

Because a distortionless pulse can be used as a gate optical pulse in this method, the accuracy of measurement can be improved. However, timing synchronization between the optical pulse to be measured and the gate optical pulse must be one hundredth of an autocorrelation width of the pulse or less. Accordingly, it can be easily applied to a measurement sample, an optical path length of which can be corrected on an optical table in a laboratory.

In a device configuration in which an incident optical pulse is separated into a probe optical pulse and a gate optical pulse, if the incident optical pulse is separated so that power of the gate optical pulse and the probe optical pulse is equal to prescribed incident power, $P_{TPA}$ becomes the largest. In addition, if it is desired that a two-photon absorption coefficient for |E probe| is made as large as possible, power should be distributed to the gate optical pulse in such a manner that a noise level becomes not more than 1/10 of a signal. In response to the property of a signal, optimum distribution ratio is used. A distribution ratio of power to the gate optical pulse and the probe optical pulse is set by changing reflection, and transmittance, of a beam splitter. For example, if energy of an optical pulse is 1 pJ or less, a distribution ratio is set at 1:1. In addition, if energy of an optical pulse is more than 1 pJ, in order to eliminate two-photon absorption of the probe optical pulse itself, power distribution to the probe optical pulse is limited within the limit of greater than or equal to a value which is one hundred times as much as a noise level. In order to select a distribution ratio, the beam splitter is replaced with another beam splitter having different reflectance and transmittance in turns. Although the latter is superior in usability, a total thickness of an optical component to be used increases. This may produce a problem of a pulse width which is extended by dispersion of the optical component.

As it is clearly understood from the principles, an instrument of optical pulse characterization according to the present invention is configured in the following manner: a fundamental absorption edge frequency of an element which constitutes a part, or the whole, of a structure comprising a medium, in which two-photon transition causes a change in transmittance or generates an optical pulse, becomes lower than or equal to a value which is twice as high as a central frequency of an optical pulse to be measured in an arbitrary polarized state; and in addition to it, the fundamental absorption edge frequency becomes higher than or equal to the sum of the central frequency and a full width at half maximum frequency of a spectrum of the optical pulse to be measured. A two-photon absorption medium in which efficiency of a frequency band of an optical pulse to be measured is high is selected As the two-photon absorption medium 1. If InP crystal is used in an optical communication band, a wavelength of which ranges from 1300 to 1600 nm, anti-reflection coating in the form of a plane having a thickness of 300 mm or less permits a spectrogram of an optical pulse having energy of 1 pJ to be measured. If a wavelength is 1500 nm, its optical pulse energy is equivalent to about $7.5 \times 10^6$ as the number of photons. The reason why two-photon absorption efficiency of the InP crystal is high is supposedly that one-photon direct transition having high dipole moment efficiency is nearly in an intermediate state. For further increase in efficiency of two-photon absorption, an optical pulse is condensed on a two-photon absorption medium. A diameter of the condensed beam is from 2 to 5 mm. If intensity of the optical pulse to be measured is low, for example, if pulse energy is less than or equal to 100 fJ or if peak power is less than or equal to 1 W, optical amplification is simultaneously performed using a two-photon absorption medium, which has a structure described below, to improve measurement sensitivity. This requires a pump source 7 which produces a gain by pumping light or electric current. As described below, in the case where optical amplification is performed in an InGaAs/InP quantum-well optical waveguide structure having a length of 200 mm by pumping electric current of 100 mA, if pulse energy of the probe optical pulse 2 is 50 fJ and that of the gate optical pulse 3 is also 50 fJ, electric field absorption intensity of the probe optical pulse 2 in the two-photon absorption medium 1 is 10% of field intensity at the time of incidence (19% if it is converted into power). The resulting change in voltage detected by the detector 6 is 5 mV or more at a wavelength of 1500 nm. Because a noise level of the detected voltage can be reduced to 50 mV or less, a S/N ratio becomes 100:1 or more.

Figure 2:
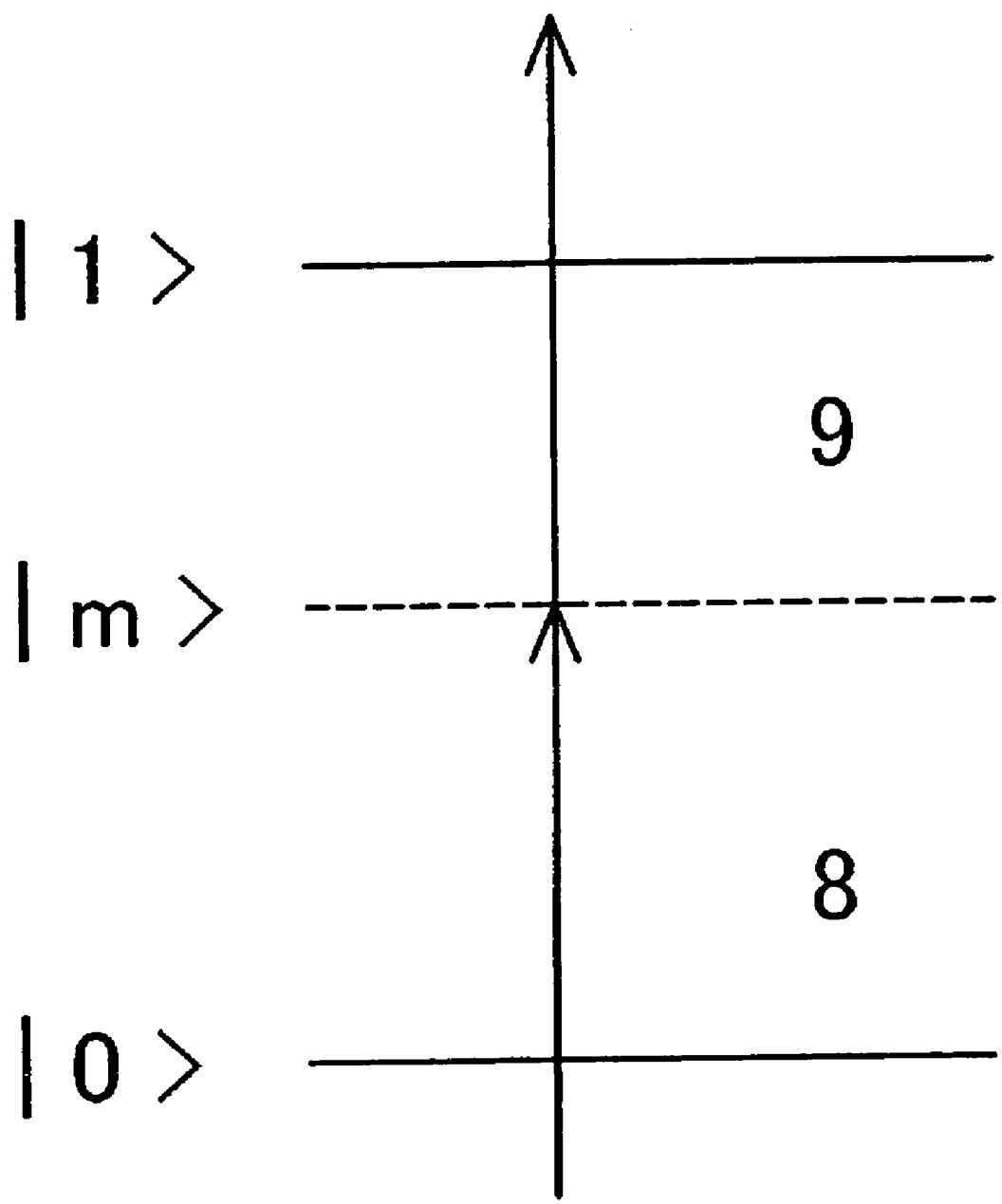
FIG. 2 is a band structure diagram illustrating a physical process in which optical gate operation occurs.
Figure 3:
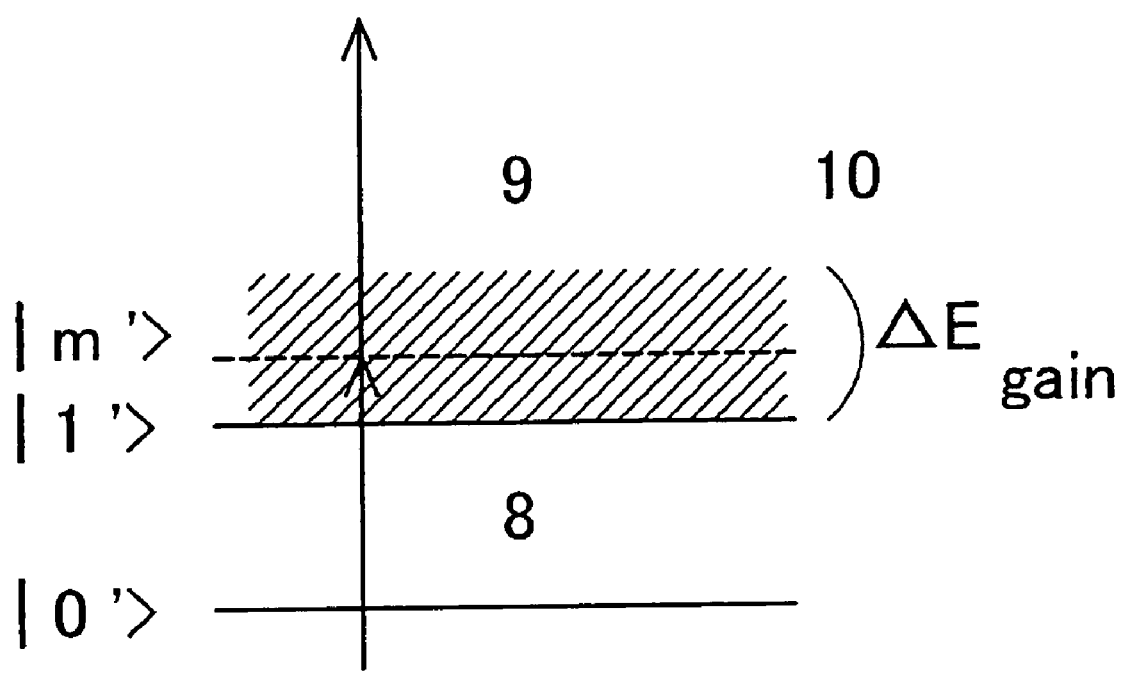
FIG. 3 is a band structure diagram illustrating a physical process in which optical gate operation occurs.

FIGS. 2 and 3 are band structure diagrams schematically illustrating a process progressing in the two-photon absorption medium 1. If the two-photon absorption medium is a solid such as InP, two-photon transition occurs between a valence band and a conduction band. In FIG. 2, a state of a top of the valence band is shown as |0>, a state of a bottom of the conduction band is shown as |1>, and a transition process is indicated by the arrow. In the case of a medium targeted in FIG. 2, band gap energy is higher than one-photon energy of an optical pulse to be measured, and is lower than two-photon energy of the optical pulse. In the first place, transition 8 by a gate optical pulse causes transition to an intermediate state |m>. There is no steady state in a band gap, but a virtual state only having an infinitesimal life exists there. The infinitesimal life enables an ultrahigh-speed optical gate function. Transition from the intermediate state |m> to the conduction band occurs as transition 9 by a probe optical pulse. In contrast with this, even if the transition by the probe optical pulse becomes transition from a valence band to an intermediate state, or even if the transition by the gate optical pulse becomes transition from an intermediate state to a conduction band, an obtained response is the same. The former and the latter processes degenerate from a physical point of view.

A thickness and a length of the two-photon absorption medium should be reduced to a degree that the values can be ignored (1/50 or less) as compared with a spectrum width and an autocorrelation width of the optical pulse measured when optical pulse extension by group velocity dispersion of a medium enters. This requires, for example, dispersion measurement to obtain a rough standard of an upper limit of a medium length, as described in IEEE J. Quantum Electron, 1991, Vol. 27, pp. 1280–1287, by K. Naganuma and H. Yasaka. If InP crystal is used, an optical pulse having a spectrum width of 20 nm and an autocorrelation pulse width of 100 fs at a wavelength of 1500 nm should have a thickness of 300 mm or less.

Because two-photon absorption is a third-order nonlinear optical effect, an imaginary part (absorption) of a third-order nonlinear coefficient is involved. However, if an absorption coefficient is intensity dependent, a refractive index as a real part also becomes intensity dependent, causing the refractive index to change in response to a change in intensity of the optical pulse with time. The change in refractive index with time is equivalent to a change in optical path length with time. Therefore, spectrum modulation of an optical pulse by a Doppler shift of a light wave is performed. As a result, a spectrum of an emitted optical pulse is different from a spectrum of an incident pulse. The effect which is called self-phase modulation cannot be avoided as long as a nonlinear optical effect is used for an optical gate. However, it is possible to reduce the self-phase modulation by suppressing optical pulse energy. A spectrum of transmitting probe and gate optical pulses is compared with that of probe and gate optical pulses before incidence. Then, incident pulse energy is adjusted so that it does not change within range of a noise level. On this point, when InP crystal is used, a standard of an upper limit of pulse energy is from 100 to 500 pJ when a condensed beam diameter is from 2 to 5 mm. It is to be noted that if a two-photon absorption medium is an InP material, and when optical amplification is simultaneously performed, a standard value of this upper limit is in inversely proportional to a gain.

When optical amplification is simultaneously performed, it is necessary to embed an amplification medium simultaneously. In the amplification medium, as shown in FIG. 3, a band gap between a top of a valence band |0'> and a bottom of a conduction band |1'> should be smaller than one-photon energy, which is in a gain area 10. A gain energy width $DE_{gain}$, and an energy position of the gain area, are set so as to cover an energy area corresponding to a spectrum width of the optical pulse to be measured. There is a possibility that two-photon absorption will occur even in an amplification medium. In such a case, assuming that a virtual state in a conduction band is an intermediate state |m'>, transition 8 and 9 by the gate optical pulse and the probe optical pulse will occur.

Figure 4:
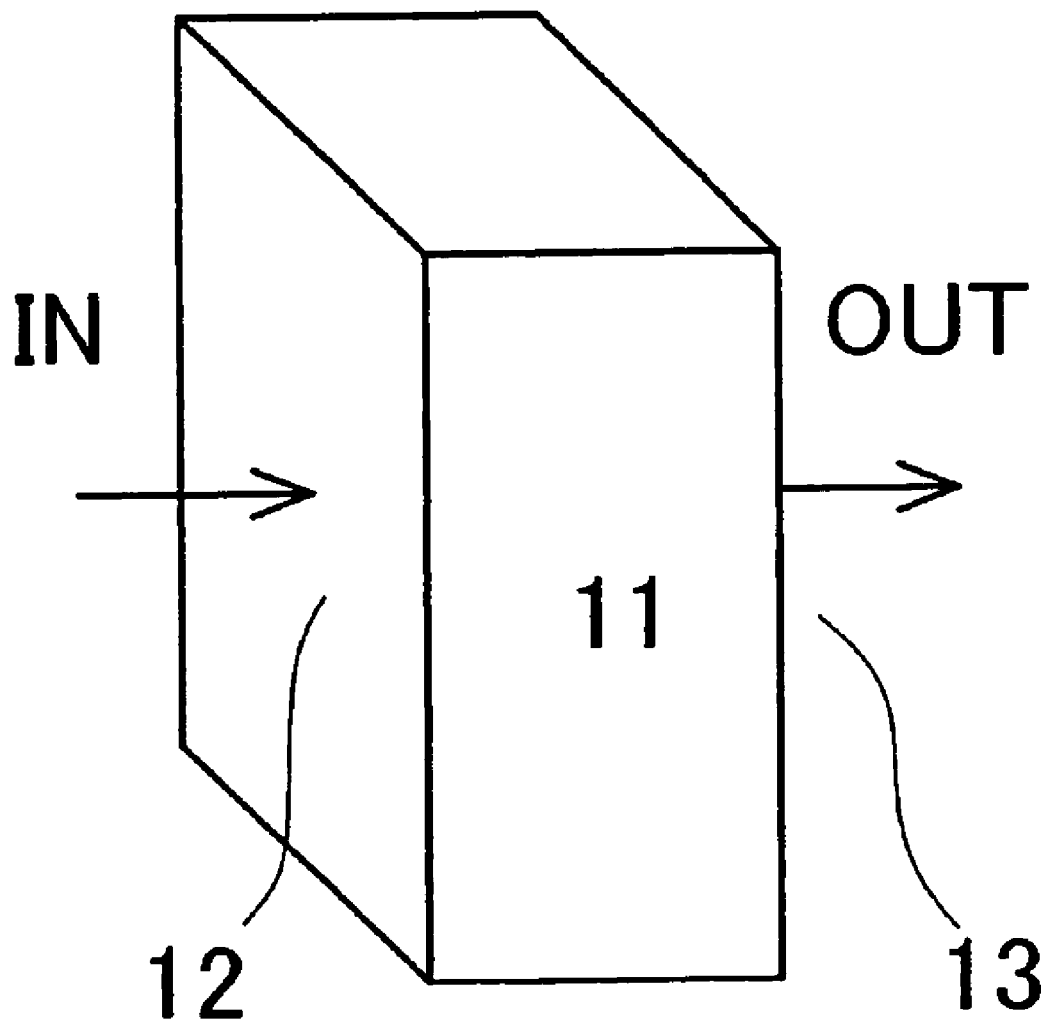
FIG. 4 is a schematic diagram illustrating a structure used as a two-photon absorption medium.
Figure 5:
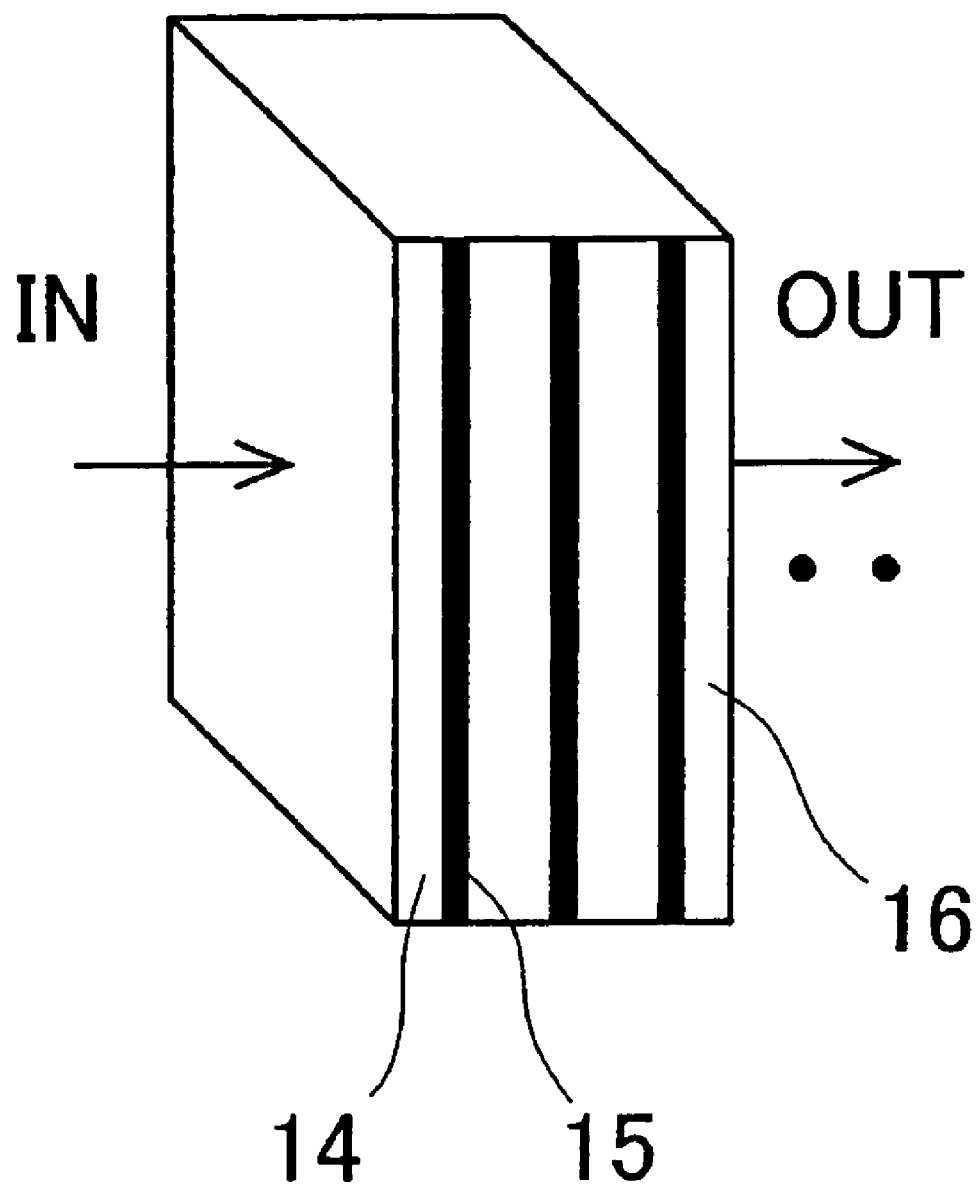
FIG. 5 is a schematic diagram illustrating another structure used as a two-photon absorption medium.
Figure 6:
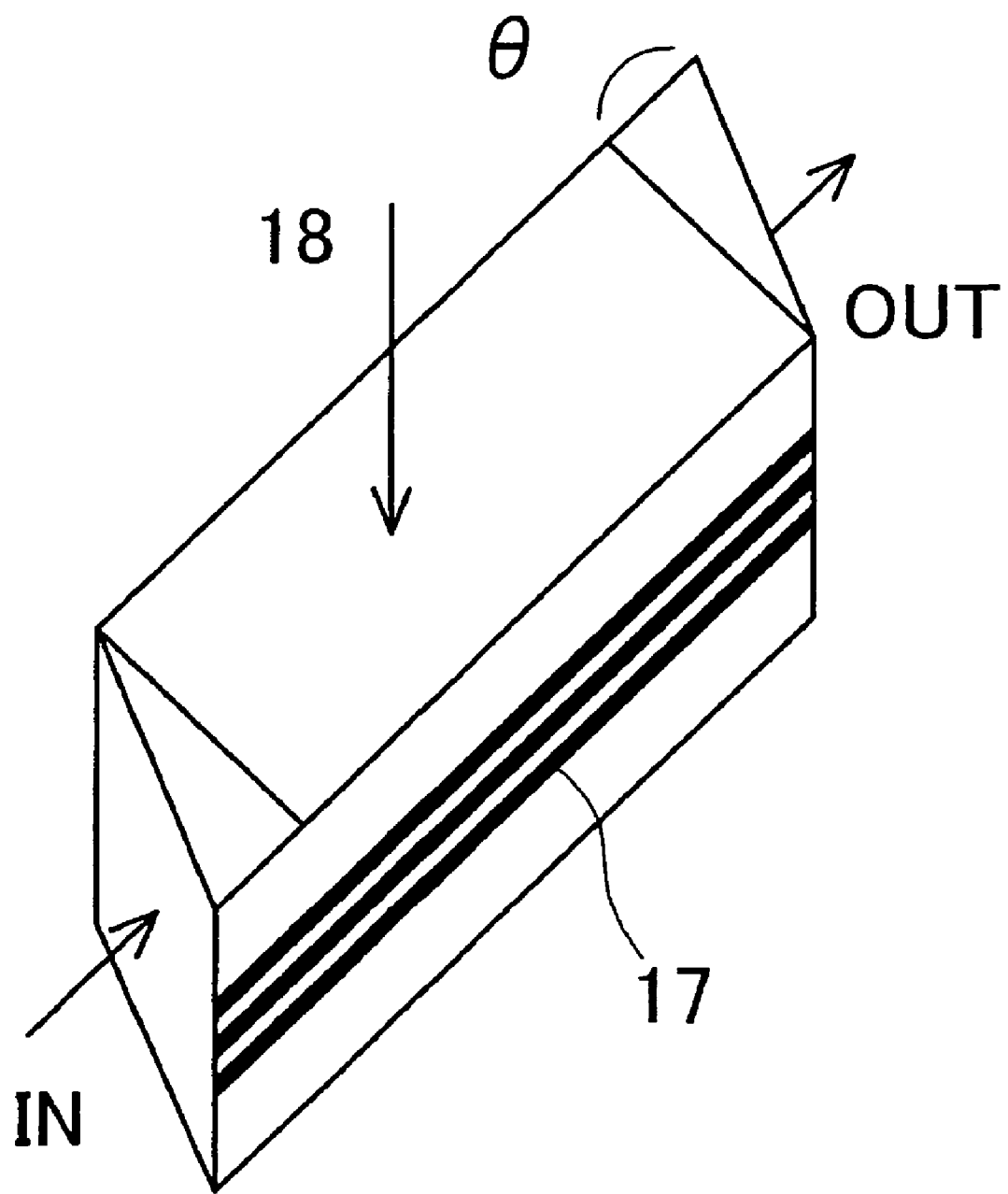
FIG. 6 is a schematic diagram illustrating another structure used as a two-photon absorption medium.

Three ways of building a structure of the two-photon absorption medium 1 are shown in FIGS. 4, 5, and 6. If the structure is not accompanied by amplification, as shown in FIG. 4, a structure to which anti-reflection coating is applied on an incidence plane 12 and a transmission plane 13 of a two-photon absorbing material 11 is used. In the optical communication band described above, InP having a thickness of 200 mm is used as the two-photon absorbing material 11. In a wavelength band different from the above-mentioned band, a material, energy of which is larger than one-photon energy and smaller than two-photon energy, and which is characterized by high efficiency of two-photon absorption, is used. For example, in a wavelength band of about 800 through 1000 nm, GaAs, ZnSe, $In_{1-x}Al_xAs$, and $In_{1-x}Ga_xP$ are appropriate. In response to a target wavelength, a composition ratio 1−x:x is set. In this connection, in the figure, in represents light incidence, and out represents light emittance. In and out are also used in a similar manner in drawings mentioned below.

FIGS. 5 and 6 illustrate an example that can be used when an amplification medium is included. To be more specific, FIG. 5 illustrates a surface type structure, and FIG. 6 illustrates a waveguide type structure. In the optical communication band, an $In_{1-x}Ga_xAs/InP$ quantum well is appropriate as the surface type structure. An $In_{1-x}Ga_xAs/InP$ quantum well in which 50 periods lamination is performed is used.

In FIG. 5, a two-photon absorption layer 14 and an amplification layer 15 are mainly an InP barrier and an $In_{1-x}Ga_x$As quantum well respectively. However, two-photon absorption occurs simultaneously even in a quantum well layer. Here, when x=0.47, lattice matching with InP is achieved. At a wavelength of 1500 nm, a thickness of a quantum well is 7 nm, and a barrier has a thickness of 10 nm. Optical pumping 16 is performed to produce a gain. As is the case with FIG. 4, anti-reflection coating is provided on an incidence plane and a transmission plane.

FIG. 6 illustrates an example of a single-mode optical waveguide type. An active region 17 is the $In_{1-x}Ga_xAs/InP$ quantum well which is the same as FIG. 5. However, it has five periods. In order to change a quantum well into an amplification medium, current injection 18 is performed. In a waveguide, a PIN junction is formed in a current injection direction. This structure functions as a semiconductor waveguide type optical amplifier. An injected current level is adjusted so as to avoid gain from saturating caused by an incident probe optical pulse and an incident gate optical pulse. Because an incidence plane and a transmission plane reduce internal reflection, the planes are slanted from a surface which is perpendicular to a travelling direction of light in a waveguide (q=5°), and as is the case with FIG. 4, anti-reflection coating is provided. The waveguide has a length of 200 mm.

Figure 7:
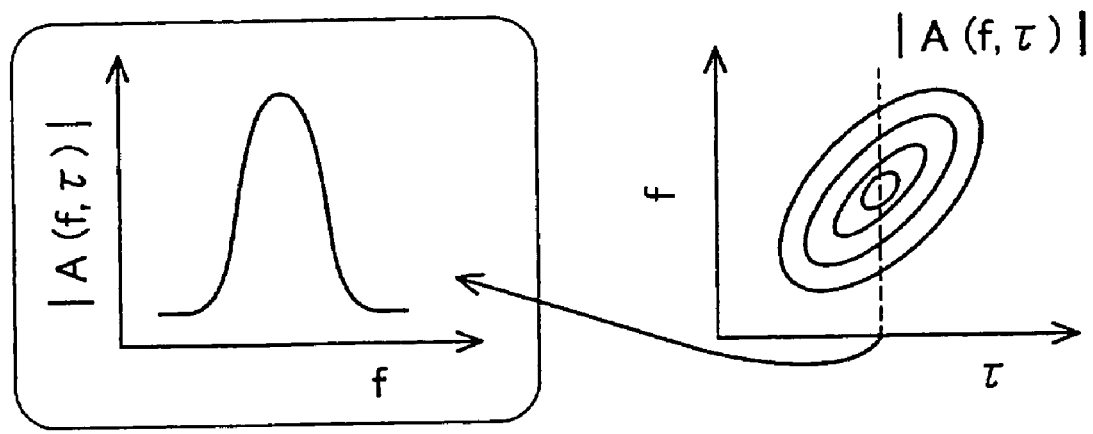
FIG. 7 is a schematic diagram illustrating results obtained by measurement using an instrument of optical pulse characterization according to the present invention.

FIG. 7 outlines measured properties. The physical quantity to be measured is intensity of electric-field absorption |A(f, t)| by two-photon absorption of a probe optical pulse, which is a function of a frequency f and delay time t. Although the frequency f and the delay time t are repeatedly swept, the frequency is swept faster than delay time. In this case, |A(f, t)| is measured for a certain constant delay time.

A left graph in FIG. 7 illustrates a waveform obtained at this time. Measuring |A(f, t)| while changing delay time in succession provides, as a right graph in FIG. 1G, properties of |A(f, t)| for which time and frequency resolution has been performed. In this connection, a spectrogram S(f, t) is represented by an numerical expression illustrated in FIG. 7.

$$|A(f,\tau)| \propto S(f,\tau) = |\int dt E_{probe}(t) I_{gate}(t-\tau) e^{-i2\pi\tau f}| \quad (4)$$

According to this numerical expression, S(f, t) is proportional to |A(f, t)|. Accordingly, time and frequency properties of the optical pulse to be measured can be obtained from time and frequency resolved data of field intensity in two-photon absorption of the probe optical pulse. As is the case with the prior art, optical pulse characterization can be achieved by rebuilding the time and frequency properties in intensity and a phase.

[Disadvantages of a Technique in which an Optical Pulse to be Measured and a Gate Optical Pulse are Colinearly Entered in a Two-photon Absorption Medium]

It is to be noted that as a method for improving measurement sensitivity, colinear placement by which a gate optical pulse and a probe optical pulse are overlaid on an axis is conventionally adopted. However, the colinear placement produces problems, which were conventionally ignored. Attention should be paid to the problems, and therefore some measures should be taken for the problems. The problems are caused by the following: a state excited by two-photon transition forms a coherent state which is free from phase disturbance; and when the coherent state is induced by other optical pulses and thereby relieved to a ground state, a third optical pulse, that is to say, an optical pulse by four-wave mixing, is generated. For example, a coherent state, which has been created by two-photon transition of a gate optical pulse, is induced by an electric field of a probe optical pulse (optical pulse to be measured), resulting in generation of an optical pulse by four-wave mixing. This third optical pulse by four-wave mixing is in the same polarized state as that of the probe optical pulse. In the colinear placement, the third optical pulse propagates in the same direction as the probe optical pulse. Therefore, the third optical pulse and the probe optical pulse interfere with each other, causing noise. Because a ratio of created coherent states was considered to be low in the past, noise caused by a conflict between two-photon absorption and four-wave mixing was ignored. However, it is found out that intensity of the third optical pulse by four-wave mixing is almost the same as an absolute value of a change in intensity of a probe optical pulse by two-photon absorption. Because of it, if colinear placement is adopted to improve sensitivity, it is necessary to provide a new means for discriminating between the third optical pulse and the probe optical pulse by four-wave mixing. The present invention provides a means for discriminating between the probe optical pulse and the third optical pulse by newly using a reference optical pulse. The pulses are discriminated judging from difference in beat frequency caused by interference with the reference optical pulse. This enables elimination of noise generated by interference between a probe optical pulse and the third optical pulse by four-wave mixing, which occurs in the conventional techniques of weak optical pulse characterization by colinear placement.

First Embodiment

Figure 8:
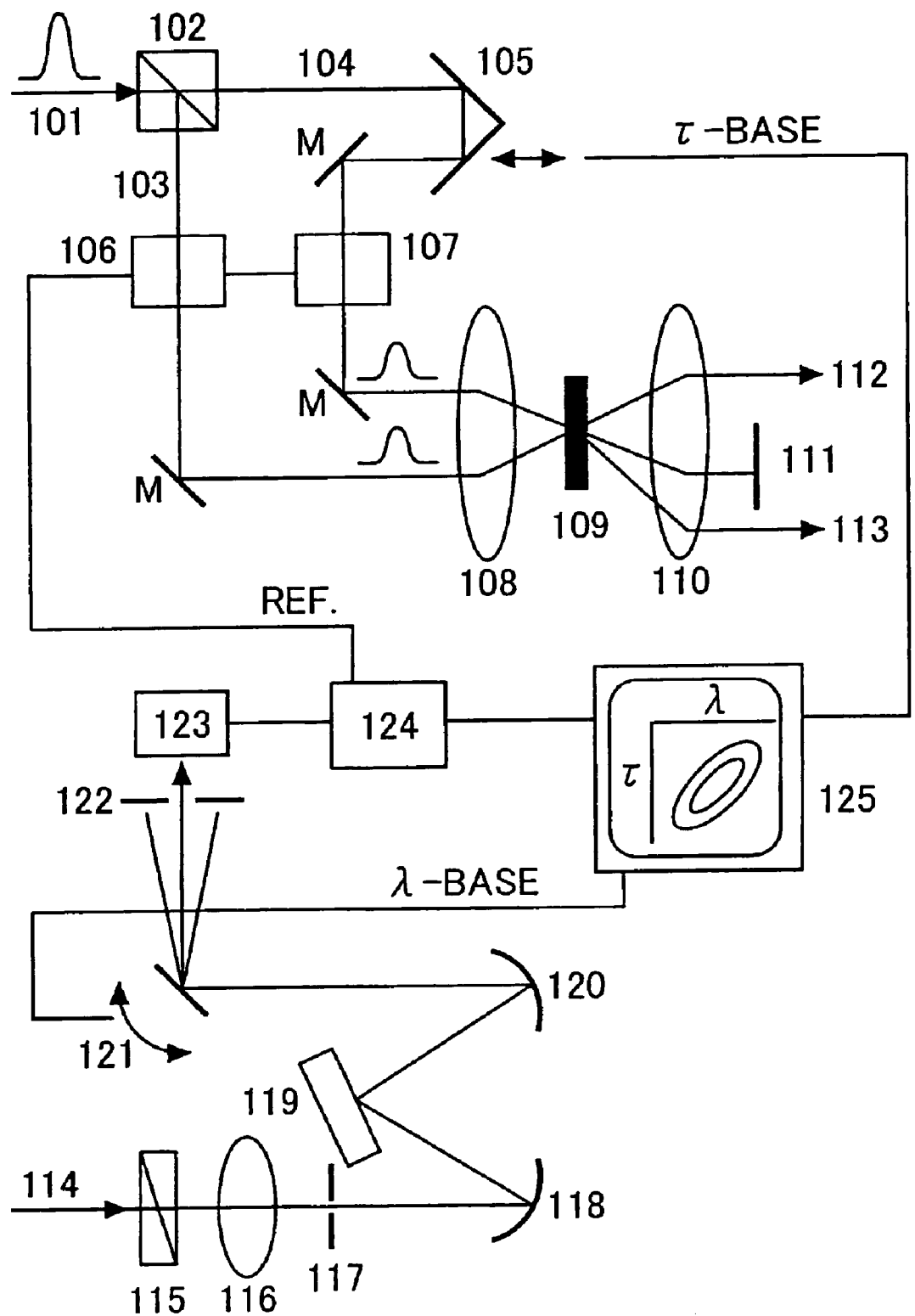
FIG. 8 is a schematic diagram illustrating a configuration of a polarization-independent optical pulse characterization instrument according to a first embodiment of the present invention.
Figure 9A:
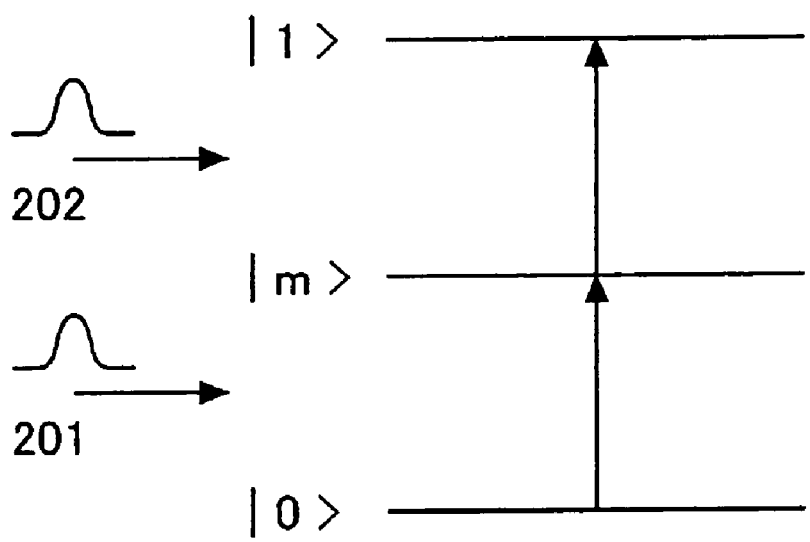
FIGS. 9A and 9B are schematic diagrams illustrating a process of two-photon absorption and a process how a third optical pulse by four-wave mixing occurs.

To begin with, an example of spectrogram measurement using a configuration in which an optical pulse to be measured in an arbitrary polarized state is used as a probe optical pulse and a gate optical pulse, and principles of polarization independent spectrogram measurement, will be described with reference to FIGS. 8 and 9. FIG. 8 is a diagram illustrating a configuration example of an instrument of optical pulse characterization according to this embodiment. FIGS. 9A and 9B is a diagram illustrating a quantum process in the cases of two-photon absorption process (9A) and four-wave mixing (9B). Specifications of the optical pulse to be measured are as follows: central wavelength is 1550 nm; pulse width is 200 fs; spectrum width is 15 nm; pulse energy is 10 pJ; and pulse repetition rate is 10 GHz.

Using a polarization independent beam splitter 102, an optical pulse to be measured 101 in an arbitrary polarized state is separated into a probe optical pulse 103, which is an optical pulses to be measured, and a gate optical pulse 104. Specifications of the polarization independent beam splitter 102 are as follows: both of transmittance and reflectance of s polarized light are 48% at a wavelength of 1550 nm (error of ±1%); both of transmittance and reflectance of p polarized light are also 48% at a wavelength of 1550 nm (error of ±1%); and centering at 1550 nm, within a wavelength range of 50 nm, fluctuations in transmittance and reflectance for s and p polarized light are 5% or less. Variable delay time is added to the gate optical pulse 104 by a polarization independent roof retroreflector 105 which is translationally driven backward and forward. For elimination of a background component, and noise reduction, by lock-in detection, the probe optical pulse 103 and the gate optical pulse 104 are modulated by light intensity modulators 106 and 107 respectively, or only the gate optical pulse 104 is modulated by the light intensity modulator 107. If residual light intensity of the gate optical pulse is high and thereby its background component produces a problem of measurement, both pulses are modulated. If not, modulation of only the gate optical pulse 104 suffices. In the former case, as modulation electric frequencies for the probe optical pulse 103 and the gate optical pulse 104, 1020 kHz and 850 kHz are provided respectively. As a reference electric frequency (ref.) of lock-in detection, 170 kHz which is a difference frequency is provided. If only the gate optical pulse 104 is modulated, both of the modulation electric frequency and the reference electric frequency are 170 kHz. If FIG. 8 is roughly divided, an upper half of the figure illustrates a two-photon correlation optical system where a symbol M indicates a polarization independent total reflection mirror.

The probe optical pulse 103 and the gate optical pulse 104 are condensed through a condenser lens 108 before they are entered into a two-photon transition medium 109. The condenser lens 108 is an aspherical lens having a focus length of 10 mm. A diameter of a condensed beam is 10 μm. The two-photon transition medium 109 is InP crystal having a thickness of 0.3 mm, an incidence plane and an emittance plane of which are provided with anti-reflection coating. If each of incident angles of the probe optical pulse 103 and the gate optical pulse 104 is 5 degrees or less with reference to a normal line to a surface of the InP crystal on which anti-reflection coating is provided, it is substantially polarization independent of two-photon transition (change is 6% or less). Because anti-reflection coating is provided, reflection from the two-photon transition medium 109 can be ignored.

The transmitted gate optical pulse is shielded by a beam block 111. As other optical pulses which are emitted, there are a transmitting probe optical pulse 112 and a third optical pulse 113 by four-wave mixing.

Intensity of the transmitting probe optical pulse 112 changes by two-photon absorption in the two-photon transition medium 109. FIG. 9A schematically illustrated a two-photon absorption process which causes a change in intensity of the transmitting probe optical pulse 112. When the gate optical pulse 201 and the probe optical pulse 202 enter simultaneously, two-photon absorption occurs, causing an electron to change from an initial state |0> to an end state |1>. An intermediate state |m> is a virtual state. In other words, in a wavelength band or a frequency band in proximity to the intermediate state, there is no real state. Accordingly, one-photon transition does not occur. However, the nearer a wavelength, or a frequency, of the intermediate state approaches a wavelength, or a frequency, of a fundamental absorption edge by one-photon transition in the two-photon transition medium, the higher efficiency of two-photon transition increases. However, if it is too near, real excitation by one photon and an absorption edge shift by many-body effect are caused, resulting in degradation of the optical gate function. A rough standard for obtaining an efficient optical gate function by two-photon transition is given as follows: a frequency of a fundamental absorption edge of the two-photon transition medium is lower than or equal to a value which is twice as high as a central frequency of an incident optical pulse; and in addition to it, the frequency of the fundamental absorption edge of the two-photon transition medium is higher than or equal to the sum of the central frequency of the optical pulse and a value which is ten times as high as a full width at half maximum frequency of a spectrum. It is to be noted that even if the gate optical pulse 201 and the probe optical pulse 202 are swapped with each other in FIG. 9A, an occurring phenomenon is equivalent. When determining a thickness of the two-photon transition medium, it is to be ensured that chromatic dispersion in the two-photon transition medium does not cause an optical pulse to spread.

Figure 9B:
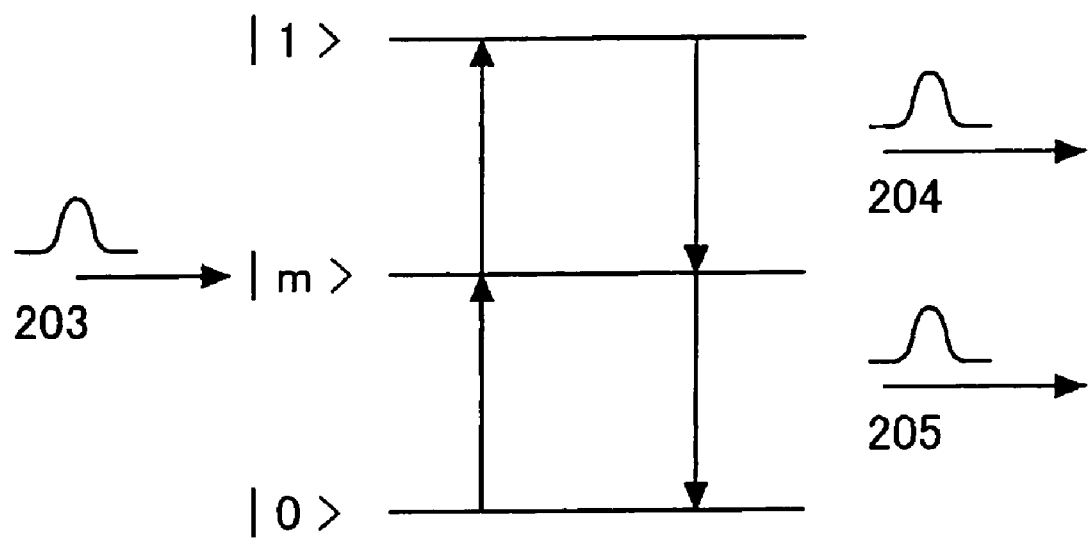

FIG. 9B schematically illustrates a process in which the third optical pulse 113 is generated by four-wave mixing. A gate optical pulse 203 causes two-photon transition from an initial state |0> to an end state |1> through a virtual intermediate state |m>. If coherence of the end state is kept, relaxation of radiation to an initial state induced by a probe optical pulse 204 occurs, which generates the third optical pulse 205. Even if the probe optical pulse 204 and the third optical pulse 205 are swapped with each other, the process is equivalent. In the case of the two-photon transition medium at a room temperature, a period of time during which coherence of an end state is kept is extremely short. At a pulse width of about 100 fs, coherence is substantially kept only when the gate optical pulse 203 and the probe optical pulse 204 enter simultaneously. This fact indicates that the four-wave mixing functions as an ultrahigh-speed optical gate. The two-photon absorption and the four-wave mixing, which have been described here, are processes which conflict with each other. When intensity of the gate optical pulse is nearly equal to that of the probe optical pulse, both processes can be achieved similarly. However, because the four-wave mixing requires coherence in an end state, intensity of the four-wave mixing is in general lower than that of the two-photon absorption. Accordingly, if the probe optical pulse 112, intensity of which has been changed by two-photon absorption, is used as an optical pulse to be measured, sensitivity often becomes high. Nevertheless, when measuring intensity of two-photon absorption, it is necessary to eliminate transmission intensity of the probe optical pulse 112 by lock-in detection. Therefore, there is fear of degradation of sensitivity caused by residual noise of transmission intensity. Such degradation of sensitivity becomes serious if the optical pulse to be measured includes a residual background component which becomes noise such as a pedestal. If background noise by a pedestal produces a problem, the third pulse 113 by four-wave mixing may be used as the optical pulse to be measured 114. In this connection, in the processes in FIG. 9A, attention should be given to the fact that a sign of a delay time axis of a spectrogram is inverted. In addition, because there is no background component of transmitted light in four-wave mixing, if sensitivity of optical detection is high, it is not necessary to perform lock-in detection. In such a case, optical pulse characterization can be achieved by a configuration excluding a light intensity modulator and a lock-in amplifier. In this case, because there is no limit of sweep time by a signal integration time constant in the lock-in amplifier, high speed sweep is possible as long as delay time and a spectrum sweep system respond.

When analyzing influence of polarization mode dispersion, only a specific polarized component of the optical pulse to be measured 114 is extracted using a polarized separation element 115. If a spectrogram for polarized two components, which are independent of each other or orthogonal to each other, is measured by rotating a polarized axis of the polarized separation element, it is possible to distinguish a difference in optical pulse property resulting from polarization, which enables characterization of polarization mode dispersion. If all polarized components are measured without resolving them into polarized components, removing the polarized separation element 115 from an optical path of the optical pulse to be measured suffices. Here, a linear polarizer is used as the polarized separation element 115 to measure a spectrogram for linear polarization of two components orthogonal to each other, and thereby polarization dependency is analyzed.

The lower part of FIG. 8 illustrates a chromatic dispersion unit. A part of an optical pulse to be measured, or all polarized components, are condensed on an incident slit 117 of the chromatic dispersion unit by a condenser lens 116. The optical pulse to be measured 114 which passed through the incident slit 117 is changed to parallel luminous flux by an incident-side spherical mirror 118. Then, chromatic dispersion is performed for the optical pulse to be measured 114 on a polarization independent diffraction grating 119. The optical pulse to be measured 114, for which chromatic dispersion has been performed, is reflected by an emittance side spherical mirror 120 and a rotation mirror 121. Then, image formation as a chromatic dispersion image is performed on an emittance slit 122. A rotating mirror 121 has a configuration in which a polarization-independent total-reflection plate mirror is mounted to a rotation axis of a motor producing repetitive rotational motion around one axis so that a reflection plane is provided in a plane parallel to the rotation axis, a center of which is included in the plane. The rotating mirror 121 is secured in such a manner that a central axis of the optical pulse to be measured 114, in a traveling direction, which is reflected by an emittance side spherical mirror 120, is orthogonal to the rotation axis of the rotating mirror 121. Detecting intensity of the optical pulse to be measured 114 passing through an emittance slit 122 by a photodetector 123 in synchronization with rotation of the mirror enables measurement of change in light intensity resulting from wavelength sweep. A detected electric signal from the photodetector 123 is inputted into a lock-in amplifier 124 where lock-in detection is performed for a reference electric frequency (ref.) from the light intensity modulators 106 and 107. 0.1 ms is given to an integration time constant in the lock-in amplifier 124. A spectrogram can be obtained by measuring an output voltage from the lock-in amplifier 124 as a function of a wavelength reference signal ($\lambda$-base) and a delay time reference signal ($\tau$-base). If the optical pulse to be measured 114 is the transmitting probe optical pulse 112, an output signal from the lock-in amplifier 124 is proportional to intensity of two-photon absorption. If the optical pulse to be measured 114 is the third optical pulse 113 by four-wave mixing, the output signal from the lock-in amplifier 124 is proportional to intensity of transient diffraction by four-wave mixing. A display/analyzing unit 125 takes charge of the following work: displaying a spectrogram in real time; and calculating a change with time in intensity of an optical pulse, a change with time in phase of the optical pulse, and change in wavelength (or frequency), from the spectrogram. A wavelength reference signal can be obtained by converting an output signal of an angle sensor into a wavelength. The angle sensor is mounted to a rotation axis of the rotating mirror 122. A delay time reference signal can be obtained by converting an output signal of a position sensor into delay time. The position sensor is mounted on a translational driving unit of the polarization independent roof retroreflector 105. A sweep rate for wavelength sweep is 80 Hz; and a sweep rate for delay time sweep is 0.56 Hz. Accordingly, one frame spectrogram can be obtained at every 1.8 second. The number of pixels for wavelength sweep is 128; and the number of pixels for delay time sweep is also 128. At the time of measurement which uses four-wave mixing as an optical gate, if lock-in detection is not used, there is no limit of sweep time by an integration time constant, which enables acquisition of one frame spectrogram at every 0.1 second.

Second Embodiment

Figure 10:
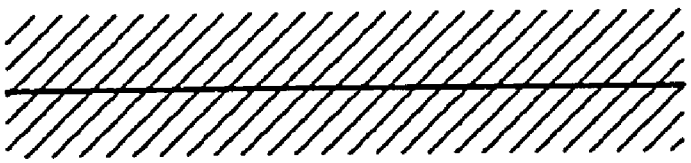
FIG. 10 is a schematic diagram illustrating the relationship between an electronic state and an optical amplification area, which are involved in two-photon transition.

If it is difficult to measure a spectrogram because energy of an optical pulse to be measured is low, providing a two-photon transition medium and an optical amplification medium at the same time enables increase in measurement sensitivity. At a wavelength of 1550 nm, an optical amplification medium has, for example, an $In_{0.53}Ga_{0.47}As$ quantum well having a thickness of 10 nm. Current injection, or optical pumping, into this quantum well causes population inversion. As a result, the quantum well functions as an amplification medium in the wavelength area. In addition, an InGaAsP quaternary compound film which has a fundamental absorption edge in the same wavelength area can also be used. FIG. 10 illustrates a state of an electron when there is an amplification medium. For an initial state |0>, a virtual intermediate state |m>, and an end state |1>, of an InP two-photon transition medium, an optical amplification area 301 is distributed over an area which includes the virtual intermediate state |m> (illustrated by oblique lines in the figure). Reserving a wavelength width $\Delta\lambda$ of the optical amplification area 301 so that $\Delta\lambda$ becomes more than or equal to a value which is three times as wide as a wavelength width of the optical pulse to be measured enables amplification in a state in which a shape of a spectrum of the optical pulse to be measured is saved. Additionally, care should be taken not to saturate a gain of an optical amplification medium. If a gain is saturated, a waveform of the optical pulse to be measured becomes distorted, which hinders correct measurement.

Figure 11:
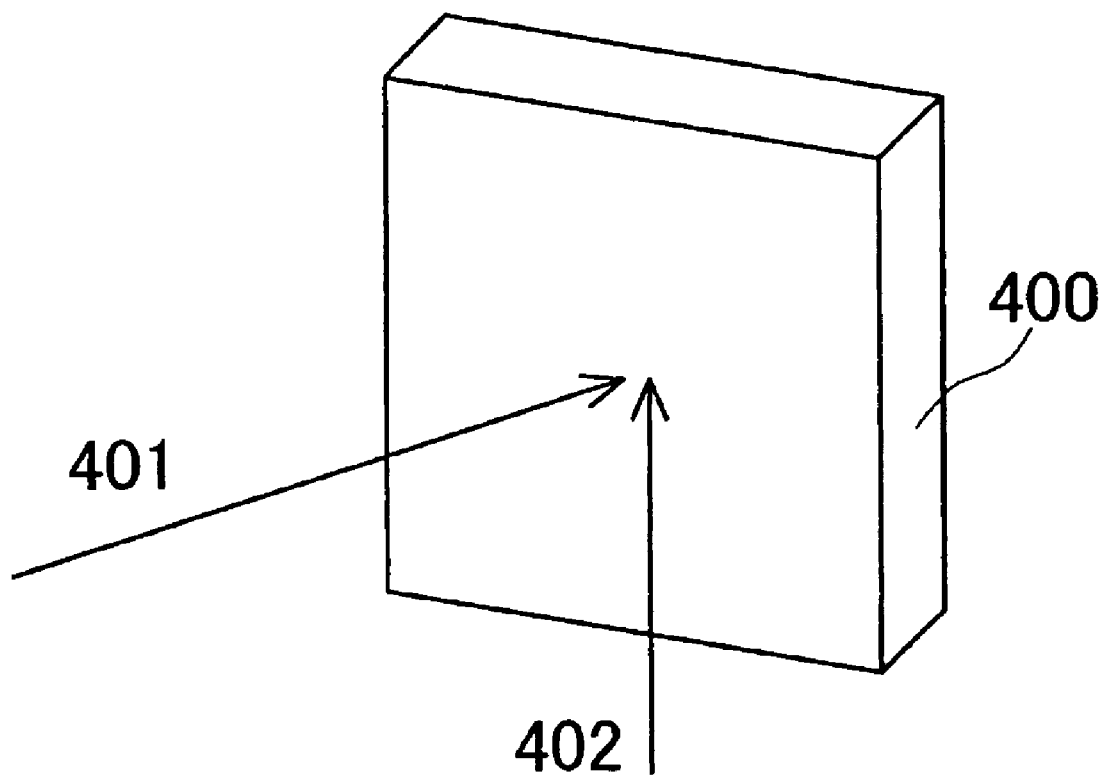
FIG. 11 is a schematic diagram illustrating a structure where there is no optical amplification medium in a two-photon transition medium.
Figure 12:
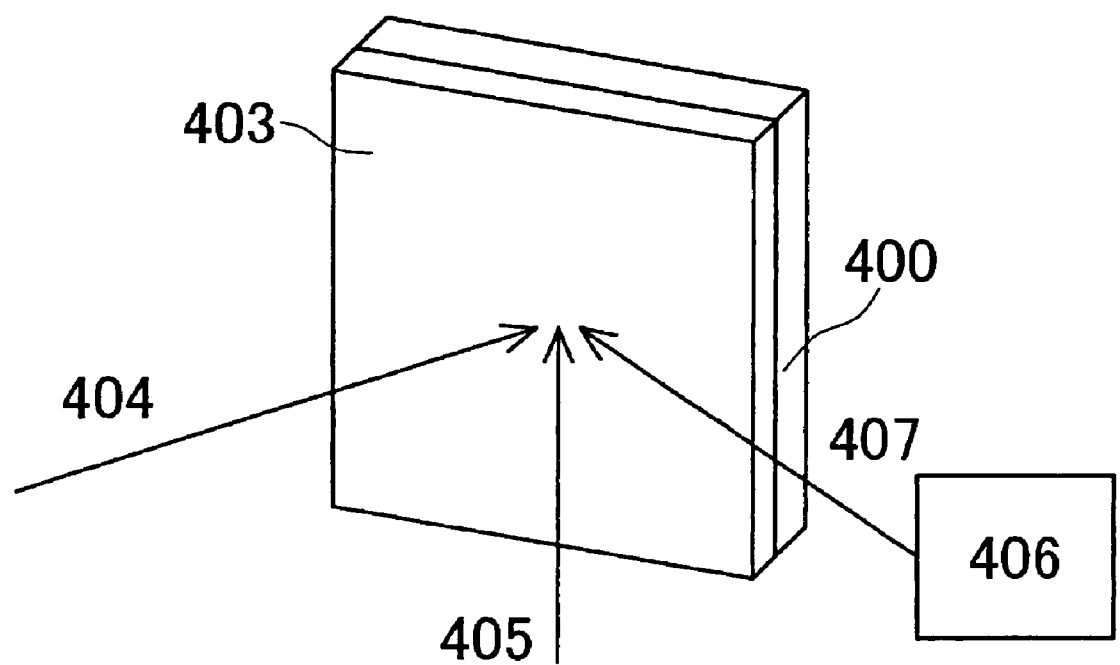
FIG. 12 is a schematic diagram illustrating a surface structure of a two-photon transition medium which includes an optical amplification medium.
Figure 13:
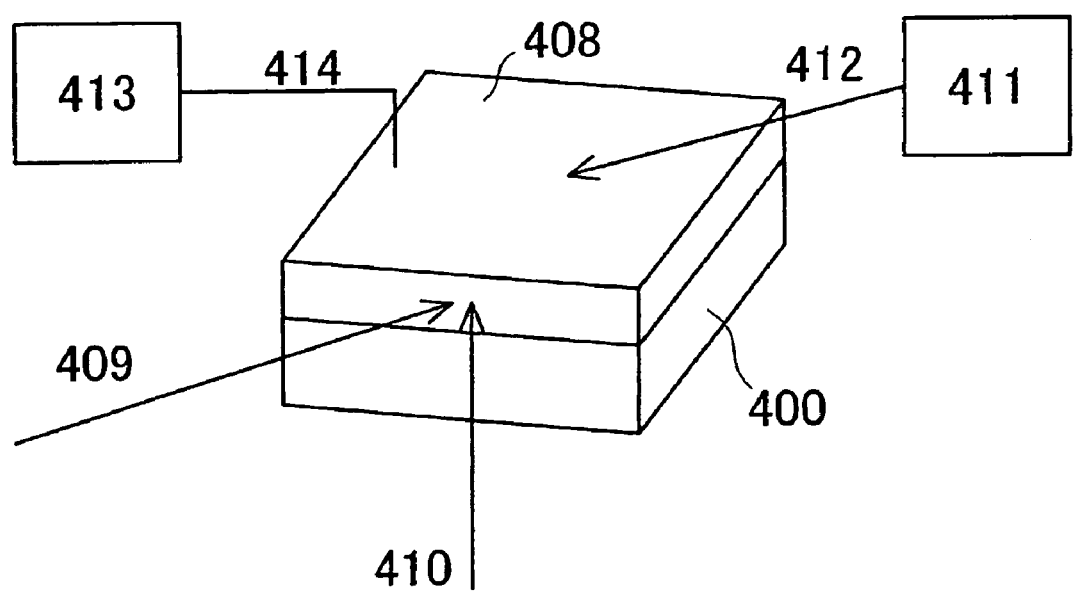
FIG. 13 is a schematic diagram illustrating a slab structure of a two-photon transition medium which includes an optical amplification medium.

FIGS. 12 and 13 are perspective views illustrating a two-photon transition medium which includes an optical amplification medium. FIG. 11 is used for comparison with the above; that is to say, this figure is a perspective view illustrating a medium which does not include the optical amplification medium. If the optical amplification medium is not included, the two-photon transition medium is, for example, InP crystal 400 on which anti-reflection coating is provided, as described in the first embodiment. FIG. 12 schematically illustrates a surface structure which includes the optical amplification medium. In this case, a layer 403 which includes the optical amplification medium is laminated on the InP crystal 400 (thickness is 0.2 mm). The layer 403 which includes the optical amplification medium is provided on the incidence plane side. In this connection, as is the case with FIG. 11, anti-reflection coating is provided on an incidence plane and an emittance plane. If the layer 403 which includes the optical amplification medium is exemplified, it is a layer on which 50 period lamination is performed by using the following as a barrier: an $In_{0.53}Ga_{0.47}As$ quantum well having a thickness of 10 nm; and an InGaAsP (thickness is 10 nm), a fundamental absorption edge wavelength of which is 1250 nm. Entering exciting light 407 from a exciting light source 406 into this structure produces a gain in an area, a center of which is the virtual intermediate state in FIG. 10. A laser diode which oscillates at a wavelength of about 980 nm is used as the exciting light source 406. Using this structure as a substitute for two-photon transition medium 109 described in the first embodiment enables increase in measurement sensitivity by ten times.

Use of a slab structure shown in FIG. 13 also enables increase in sensitivity similarly. As a layer 408 which includes an optical amplification medium, an optical waveguide layer which includes the following is used: an $In_{0.53}Ga_{0.47}As$ quantum well having a thickness of 10 nm, and having five periods centrally; and an InGaAsP (thickness is 10 nm) barrier pair, a fundamental absorption edge wavelength of which is 1250 nm. In this connection, reference numeral 400 is InP crystal. When producing a gain by optical pumping, exciting light 412 from the exciting light source 411 is used. Specifications of the exciting light source 411, which are the same as those shown in FIG. 12, are used. When producing a gain by optical waveguide current injection, it is required that the optical waveguide layer forms a current injection junction. Therefore, the InP crystal to be used, which is a substrate on which these layers are laminated, must have conductivity. A lead wire 414 used for current injection from a current injection source 413 is connected to the top surface of the layer 408 which includes the optical amplification medium. On the back of the substrate, anti-reflection coating is provided on an incidence plane and an emittance plane, having a slab structure, on which earth connection is made. As described in the first embodiment, the probe optical pulse 409 and the gate optical pulse 410 should enter in a lateral direction; that is to say, the pulses should enter while crossing each other in a surface parallel to a substrate surface. Moreover, it is necessary to define a width in a lateral direction of a slab waveguide layer so that the transmitting probe optical pulse and the third optical pulse by four-wave mixing can be extracted. In a structure having a length of 0.2 mm, 0.04 mm or more is required for a width in a lateral direction of the slab waveguide layer in FIG. 12.

In the above-mentioned layer which includes the optical amplification medium, there is no InGaAs quantum well which becomes an amplification medium. Therefore, measurement sensitivity increases even if only an InGaAsP barrier is used. The reason is that a wavelength of a fundamental absorption edge of the InGaAsP barrier is longer than that of InP, and is near to a central wavelength of the optical pulse to be measured, resulting in increase in intensity of an oscillator in transition through a virtual intermediate state. Accordingly, increase in measurement sensitivity is achieved only by laminating InGaAsP, which is provided on the InP substrate as the barrier, by a thickness of about 1 μm.

Third Embodiment

Figure 14:
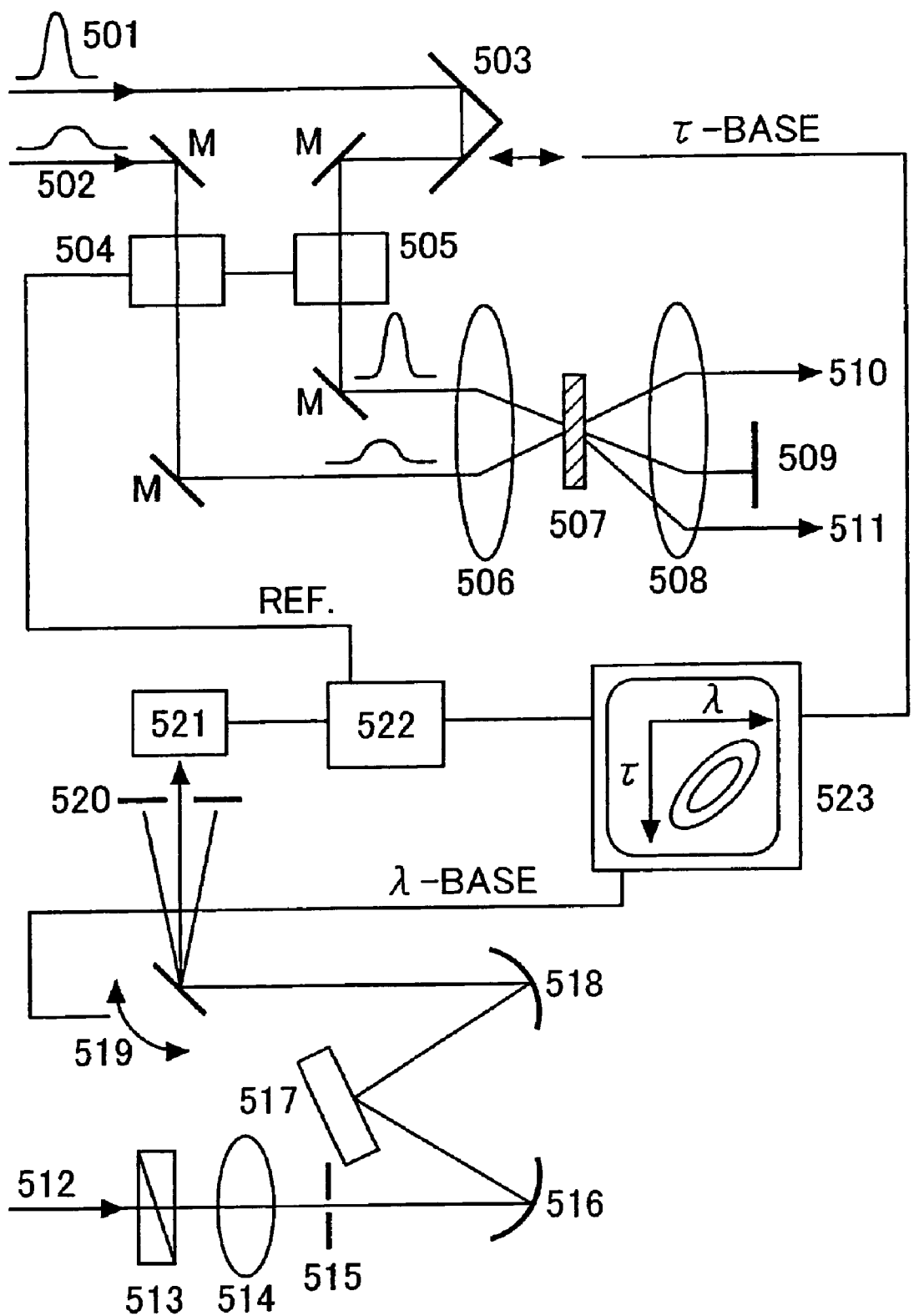
FIG. 14 is a schematic diagram illustrating a configuration of a polarization-independent optical pulse characterization instrument according to a third embodiment of the present invention.

A case where an optical pulse which is different from a probe optical pulse is used as a gate optical pulse will be described with reference to FIG. 14. A gate optical pulse 501 is required to have the same repetition rate as that of a probe optical pulse 502 which is an optical pulse to be measured. Therefore, clock extraction is performed for a repetition rate of the optical pulse to be measured, and then the gate optical pulse 501 is generated using the clock. If a time length of the optical pulse to be measured is long (for example, 10 ps or more), or if the optical pulse to be measured is in a state in which independent pulses stretch in a row, as described in the first embodiment, use of the optical pulse to be measured as a gate optical pulse causes a spectrogram to become complicated, resulting in difficulty in analyzing optical pulse properties. In such a case, if a single ultrashort optical pulse, which is in a Fourier transform limit, is used as the gate optical pulse 501 to measures a spectrogram by a device which uses a configuration shown in FIG. 14, analysis of optical pulse properties becomes easy. A disadvantage is that resolution of measuring time depends on accuracy of clock extraction from the optical pulse to be measured. Because the gate optical pulse 501 is independent of the probe optical pulse 502, a polarization independent beam splitter is not required. The other parts are the same as a device configuration shown in FIG. 8. Therefore, a method for improving sensitivity described in the second embodiment can be applied.

Fourth Embodiment

Figure 15:
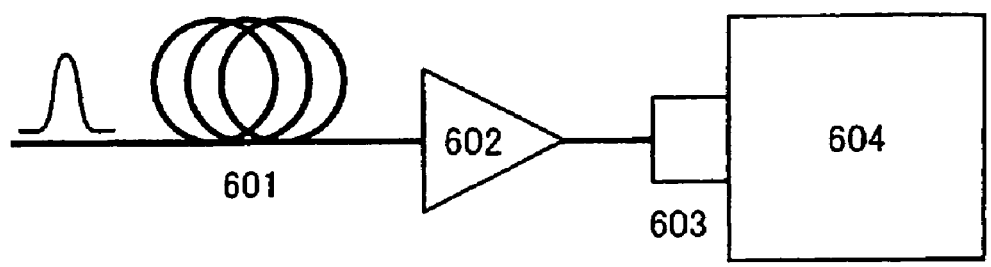
FIG. 15 is a schematic diagram illustrating a configuration by which polarization dependency of properties of an optical pulse in an optical fiber transmission line is characterized using a polarization-independent optical pulse characterization instrument.
Figures 16A, 16B, 16C:
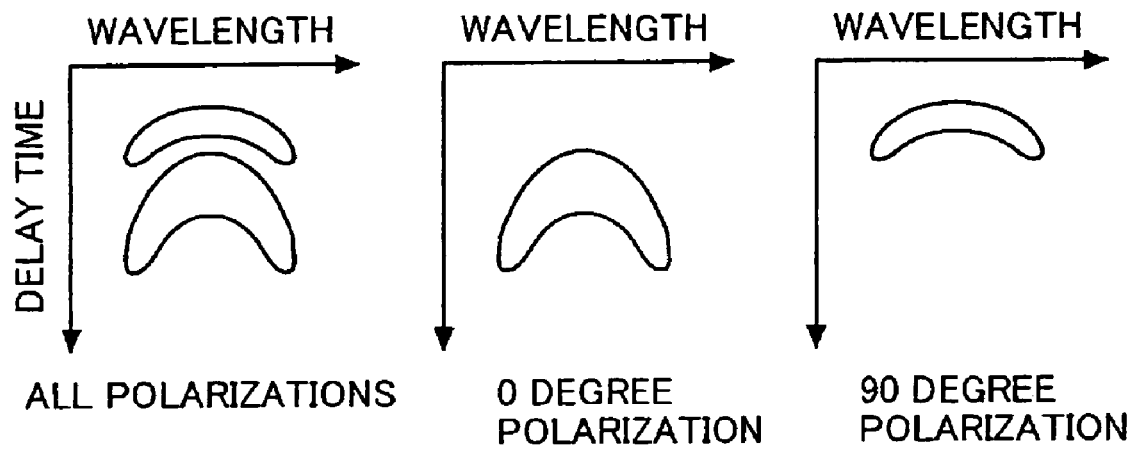
FIGS. 16A to 16C are diagrams illustrating an example of relationship between delay time and a wavelength of an optical pulse.
Figure 17:
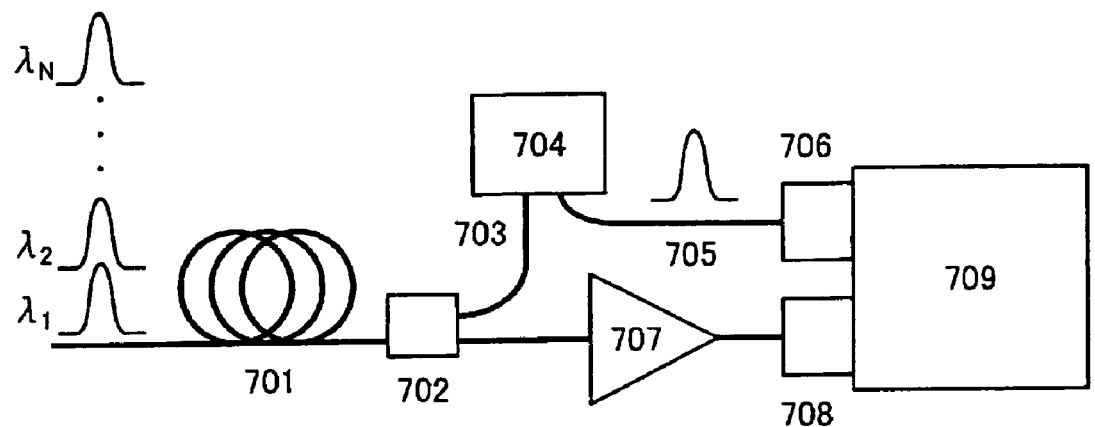
FIG. 17 is a schematic diagram illustrating a configuration by which properties of an optical pulse in a wavelength-multiplexed optical fiber transmission line is characterized using a polarization-independent optical pulse characterization instrument.
Figure 18:
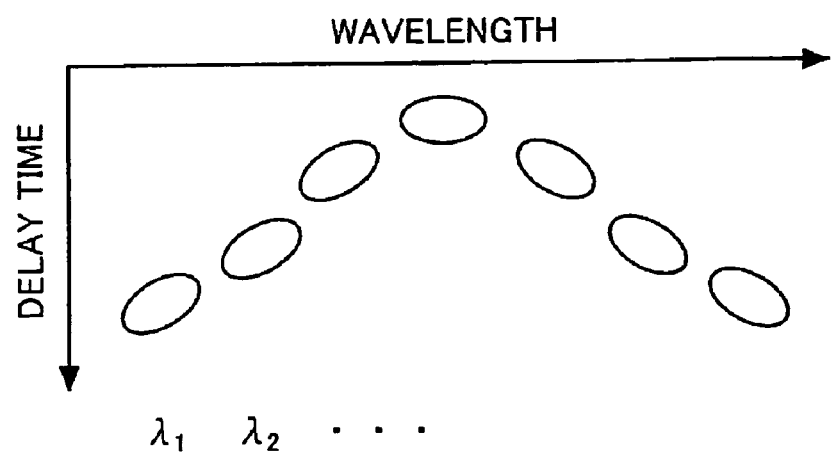
FIG. 18 is a diagram illustrating an example of the relationship between delay time and a wavelength of an optical pulse.

Examples in which the polarization-independent optical pulse characterization instrument described in the first, second, and third embodiments is used for characterization of an optical pulse propagating through an optical fiber transmission line will be described with reference to FIGS. 15 through 17. FIG. 15 is a diagram illustrating a configuration example of optical pulse characterization in an optical fiber transmission line according to this embodiment. FIGS. 16A to 16C are diagrams illustrating an example of relation between time and wavelength properties of an optical pulse and a polarized component. FIG. 17 is a diagram illustrating a configuration example of optical pulse characterization in an optical fiber transmission line at the time of wavelength-multiplexed communication. FIG. 18 is a diagram illustrating relationship between delay time, and a wavelength, of an optical pulse.

FIG. 15 is a diagram illustrating a device which has the configuration described in the first embodiment; in this case, a gate optical pulse generates an optical pulse to be measured through a polarization independent beam splitter. An optical fiber transmission line 601 is a transmission line having a total length of 100 km, to which a dispersion compensation single mode optical fiber, a dispersion shift single mode optical fiber, and a normal dispersion single-mode optical fiber are connected. Total group velocity dispersion is 0, and optical pulse modification by a nonlinear effect is also suppressed. In this transmission line, chromatic dispersion is controlled by a third-order operator. In addition, because a distance is long, influence of polarization mode dispersion cannot be ignored. For this reason, an optical pulse is amplified by an optical amplifier 602 in advance without changing a waveform before the spectrogram measurement. If the loss does not produce a problem, the optical amplifier 602 may be omitted. The optical pulse to be measured is converted into parallel luminous flux by an optical fiber connecting unit 603, and then the parallel luminous flux is entered into a spectrogram measurement analyzing unit 604. A configuration of the spectrogram measurement analyzing unit 604 is the same as that illustrated in FIG. 8. In order to improve sensitivity, a structure shown in FIG. 12 is adopted as a two-photon transition medium. Judging from the measurement which does not use a polarized separation element, it is found out that an optical pulse which has propagated through the optical fiber transmission line 601 contains two components, each of which has a parabolically distorted waveform mainly because of the third-order chromatic dispersion. In addition, a linear polarization element which is a polarized separation element is rotated by 90 degrees to measure a spectrogram for linear polarization of the two orthogonal components. As a result, time and wavelength properties of the optical pulse is separated by a polarized component, and thereby waveform distortion by polarization mode dispersion can be characterized concurrently with chromatic dispersion. In examples in FIGS. 16A to 16C, when polarization is orthogonal, pulse components are completely separated on a delay time axis, which indicates that it is caused by first-order polarization mode dispersion. This method is also effective for characterization of second order polarization mode dispersion. In this case, it is discriminated by the fact that if polarization is different, a wavelength component differs.

A configuration shown in FIG. 17 is used for characterizing properties of pulse propagation in a wavelength-multiplexed optical fiber transmission line 701 through which optical pulses propagates; the number of the optical pulses is N, and each channel has a wavelength of λ1 through λN. A wavelength-multiplexed optical pulse train is equivalent to a case where independent pulses stretches in a row to constitute an optical pulse to be measured as described in the third embodiment. Accordingly, a part of energy of an optical pulse (for example, λ1) in a certain one channel is extracted from a clock optical pulse extracting port 702, and is then entered into a gate optical pulse generating unit 704 through a clock optical pulse extracting optical fiber 703. An optical pulse of a Fourier transform limit is generated from a pulse of a channel 1 as a gate optical pulse, is passed through a gate optical pulse inputting optical fiber 705, and is then converted into parallel luminous flux by an optical fiber connecting unit for gate optical pulse 706 before the parallel luminous flux is entered into a spectrogram measurement analyzing unit 709. The spectrogram measurement analyzing unit 709 has the configuration described in the third embodiment. On the other hand, if intensity of the optical pulse to be measured constituted of a wavelength-multiplexed optical pulse is low, the intensity is amplified so as to avoid distortion of an optical pulse waveform in an optical amplifier 707. After that, the optical pulse to be measured is converted into parallel luminous flux by an optical fiber connecting unit for optical pulse to be measured 708, and then the parallel luminous flux is entered into a spectrogram measurement analyzing unit 709. This configuration enables the following characterization: group velocity dispersion of an optical pulse for each channel; a difference in time and wavelength properties by polarization mode dispersion; and a pulse delay between channels.

Fifth Embodiment

In the embodiments described above, in order to discriminate between optical gate operation by four-wave mixing and that by two-photon absorption, a gate optical pulse and a probe optical pulse are entered into a two-photon transition medium so that the pulses cross each other, and thereby a transmitting probe optical pulse and the third optical pulse by four-wave mixing are spatially separated. However, in the case of the crossing incidence, beam overlapping of a gate optical pulse and a probe optical pulse is limited to a part of the two-photon transition medium. Therefore, it is difficult to improve efficiency of an optical gate so as to increase measurement sensitivity. For this reason, the gate optical pulse and the probe optical pulse are entered on the same axis so that the gate optical pulse and the probe optical pulse interact in the whole two-photon transition medium area to increase efficiency of an optical gate, leading to high sensitivity characterization. Such an example will be described with reference to FIG. 19. In this example, it is not possible to separate spatially a transmitting probe optical pulse from a third optical pulse by four-wave mixing. Therefore, after the transmitting probe optical pulse and the third optical pulse pass through an optical frequency shifter, the pulses interfere with a reference optical pulse. Then, the pulses are separated using a difference between beat frequencies caused by the interference.

Figure 19:
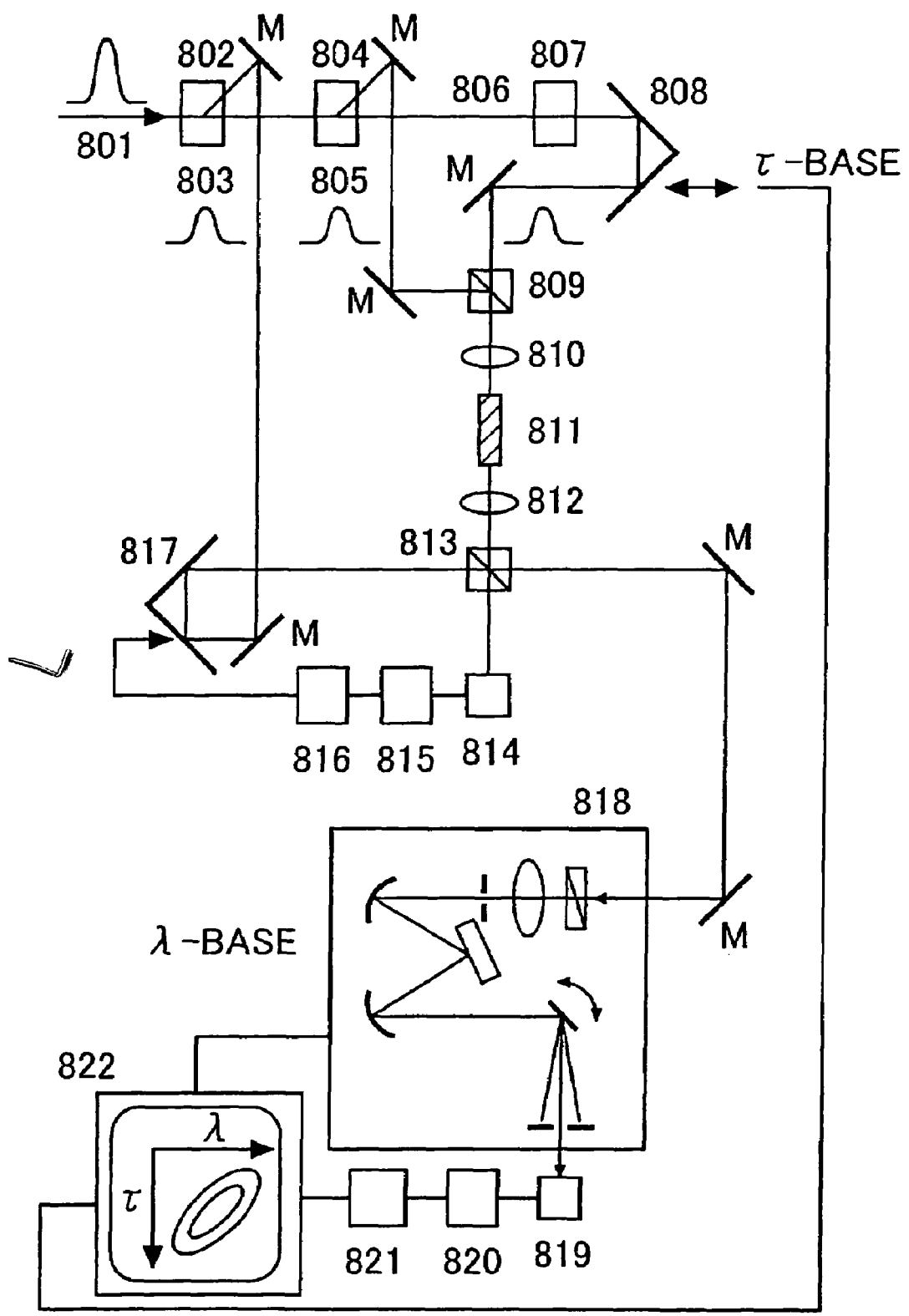
FIG. 19 is a schematic diagram illustrating a configuration of a polarization-independent high-sensitivity optical pulse characterization instrument according to a fifth embodiment of the present invention.

An optical pulse to be measured 801 is passed through an optical frequency shifter 802 to extract a reference optical pulse 803. As the optical frequency shifter 802, for example, an optical frequency shifter which uses acousto-optic crystal, and which is not polarization dependent in a spectrum to be measured, is selected. A carrier frequency of the reference optical pulse 803 shifts upward only by 80 MHz. The optical pulse to be measured, which has passed through the optical frequency shifter 802, is given to another optical frequency shifter 804 (equivalent to 802) where the optical pulse to be measured is separated into a probe optical pulse 805 and a gate optical pulse 806. A carrier frequency of the probe optical pulse shifts upward only by 81 MHz. The gate optical pulse 806 is intensity-modulated with a frequency of 170 kHz by a light intensity modulator 807. Then, variable delay time is added to the gate optical pulse 806 by a polarization independent roof retroreflector 808 which is translationally driven backward and forward. A reference frequency for lock-in detection is 170 kHz. In FIG. 19, a symbol M indicates a polarization independent total reflection mirror. The probe optical pulse 805 and the gate optical pulse 806 are directed to the same axis by a polarization independent beam coupler 809, and are then condensed on an incidence plane of a two-photon transition medium 811 by a condenser lens 810. All optical pulses emitted by an emittance plane of the two-photon transition medium 811 are converted into parallel luminous flux by a collimation lens 812. As the two-photon transition medium 811, a semiconductor optical waveguide amplifier (polarization dependence is 1 dB or less) in a single lateral mode is used. The optical amplification area 301 in FIG. 10 covers a spectrum of the optical pulse to be measured 801. All optical pulses emitted from the two-photon transition medium 811 are interfered with the reference optical pulse 803 by another polarized beam coupler 813. Because carrier frequencies differ from each other by the optical frequency shifters 802 and 804, a beat occurs at the different frequencies. If the reference optical pulse 803 interferes with a transmitting probe optical pulse, a transmitting gate optical pulse, a four-wave mixing optical pulse by probe optical pulse two-photon transition, or a four-wave mixing optical pulse by gate optical pulse two-photon transition, the frequency becomes 1 MHz, 80 MHz, 82 MHz, or 161 MHz respectively.

An example in which an optical gate by two-photon absorption is utilized will be described as below. If an optical gate by four-wave mixing is used, a transmission center frequency of a band-pass filter describe below is changed to the one equivalent to a beat frequency, and thereby measurement is performed according to the points to be attended to as described in the first embodiment.

To begin with, it is necessary to stabilize a phase of a beat caused by interference. In order to achieve the stabilization, from among light intensity components received by a photodetector 814, a beat component of the probe optical pulse, which has experienced fluctuations in intensity by two-photon absorption, is extracted by a band-pass filter 815. The band-pass filter 815 includes a transmission band having a central frequency of 1 MHz, and having a width of 200 kHz. Referring to a phase of the beat component, and giving an inverted component of a reference phase as feedback to a polarization independent roof retroreflector for phase control 817 by a phase controller 816, enable stabilization of a beat phase. If a phase of the beat component is stable from the beginning, the feedback is not necessary.

Another equivalent beam generated in a polarization independent beam coupler 813 is led to a chromatic dispersion unit which is similar to that shown in FIG. 1. Then, using a band-pass filter 820, only the beat component is extracted from among the light signals received by a photodetector 819, and lock-in detection is performed by a lock-in amplifier 821 with reference to an intensity modulation signal of a gate optical pulse to display a two-photon absorption spectrogram on a display/analyzing unit 822. As a result, for an optical pulse to be measured which has a pulse width of 200 fs, sensitivity can be increased up to a lowest detectable pulse energy of 10 fJ.

Sixth Embodiment

Figure 20:
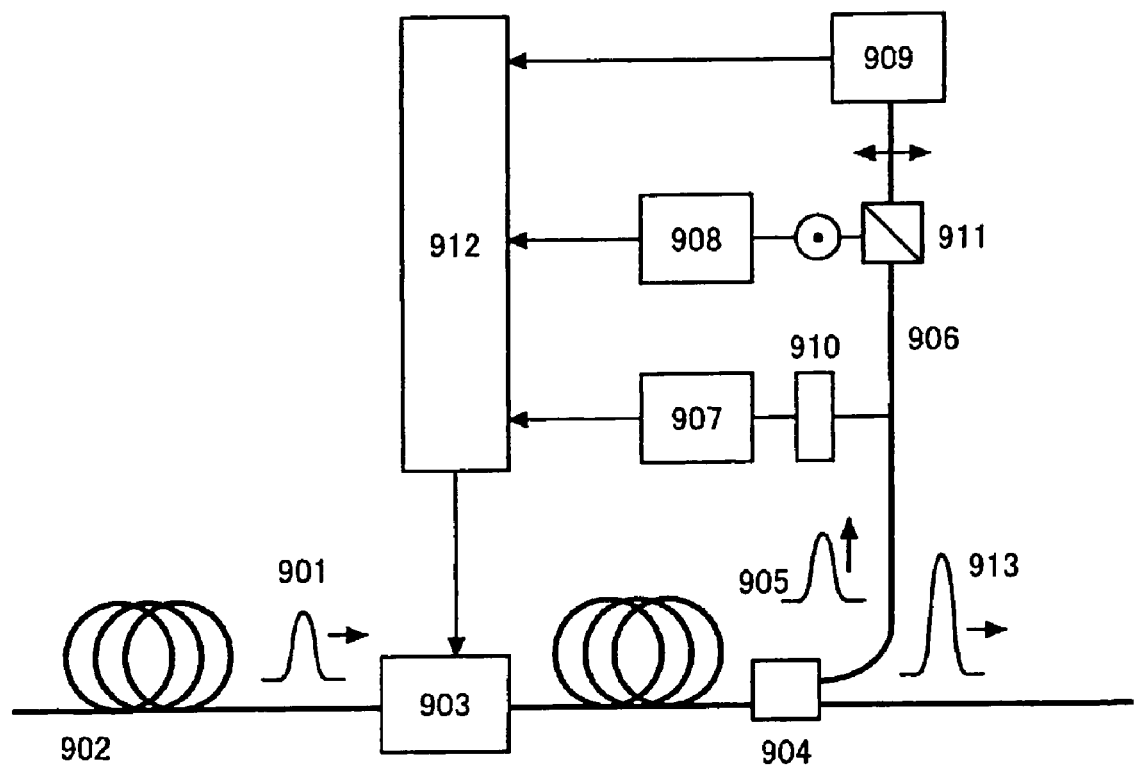
FIG. 20 is a diagram exemplifying a configuration, by which dispersion compensation is performed in an optical fiber transmission system, according to a sixth embodiment of the present invention.

In the fourth embodiment, a method for characterizing a pulse propagating through an optical fiber transmission line was described with reference to FIG. 15. Here, in this embodiment, a configuration in which on the basis of characterized waveform data, dispersion compensation, or an optical pulse waveform, in an optical fiber transmission system is optimized to decrease an error rate at the time of signal transmission will be described as below. FIG. 20 is a diagram illustrating a configuration example of an optical communication system which performs dispersion compensation of an optical fiber. In this case, dispersion means chromatic dispersion or polarization mode dispersion. It is assumed that an optical pulse 901 before dispersion compensation propagates from left to right through an optical fiber transmission line 902 constituting a target transmission system. For the purpose of compensating chromatic dispersion or polarization mode dispersion, a dispersion compensator 903 is connected in the middle of the optical fiber transmission line. In order to extract an optical pulse for monitoring 905, an optical pulse monitoring port 904 is provided behind the dispersion compensator 903. The optical pulse for monitoring 905 is passed through an optical fiber for monitoring 906 to split the optical pulse for monitoring 905 into three paths leading to spectrogram measurement analyzing units 907 through 909. As compared with the quantity of dispersion occurring in the optical fiber transmission line 902, dispersion occurring in the optical fiber for monitoring 906 is suppressed to a level which can be ignored. The spectrogram measurement analyzing units 907 through 909 are configured in the same manner as the instrument of optical pulse characterization shown in FIG. 8 or 19. Connection to the optical fiber for monitoring 906 follows a configuration in FIG. 15. The spectrogram measurement analyzing unit 907 is used for chromatic dispersion characterization in all polarization components. If further reduction in polarization dependency of the spectrogram measurement analyzing unit 907 is required, connecting polarization eliminating element 910 to the front part of the spectrogram measurement analyzing unit 907 suffices. If only chromatic dispersion is characterized, connecting it to only the spectrogram measurement analyzing unit 907 is required. Connection to the other two spectrogram measurement analyzing units 908 and 909 can be omitted. When characterizing optical pulse distortion by polarization mode dispersion, it is necessary to measure a spectrogram in biaxial polarization components orthogonal to each other. Here, through a polarized beam splitter 911, the optical pulse is split into two linear polarization components; one is in a horizontal direction, and the other is in a vertical direction in the figure. The component in a vertical direction in the figure is characterized by the spectrogram measurement analyzing unit 908; and the component in a horizontal direction is characterized by the spectrogram measurement analyzing unit 909. The following is transmitted to a dispersion control unit 912 as waveform data: a spectrogram; or peak intensity time, and a spectrum dependence property, in the spectrogram. In the dispersion control unit 912, on the basis of the waveform data from the spectrogram measurement analyzing units 907 through 909, a feedback signal for dispersion compensation is transmitted to the dispersion compensator 903. As a result, dispersion is eliminated from an optical pulse 913 after dispersion compensation at the rear of the optical pulse monitoring port; or a waveform is optimized in response to properties of the whole optical fiber transmission system.

Steps of dispersion compensation performed in the dispersion compensator 903 will be described. In order to compensate chromatic dispersion, the optical pulse to be compensated is passed through a chromatic dispersion body such as a diffraction grating to resolve the optical pulse into wavelength components, which are then converted into parallel luminous flux. After that, a phase of each wavelength component is passed through a phase modulator where chromatic dispersion is eliminated. Moreover, the optical pulse is passed through another chromatic dispersion body in the reverse direction, and thereby through a reverse process of resolution into wavelength components, the optical pulse is converted into an optical pulse in which chromatic dispersion has been compensated. As a method that enables such compensation, there is a method in which a chromatic dispersion optical delay unit is used as a dispersion compensator. In the chromatic dispersion optical delay unit, a diffraction grating, a lens, a liquid crystal spatial light modulator, a lens, and a diffraction grating are placed in series while they are separated from each other only by a focal length of each lens. In addition, if a similar function is realized by an optical waveguide type element, a phase modulator array having the same number of elements is placed after wavelength separation by an array waveguide diffraction grating so as to eliminate dispersion. After that, another array waveguide diffraction grating is used as a wavelength-multiplexed coupler. In the example described above, information which is given from the dispersion control unit 912 to the dispersion compensator 903 as feedback is the quantity of phase shift in each wavelength component.

If polarization mode dispersion is compensated, two ways of methods can be considered. In the first method, the dispersion compensator 903 is provided with a half-wave plate after a quarter-wave plate. In this configuration, polarization of an optical pulse is converted into a straight line by the quarter-wave plate; and an angle of linear polarization is adjusted by the half-wave plate. Feedback information is an rotation angle of each of the wave plates. A case where dispersion can be compensated in the steps is mainly a case where time-spectrum properties of optical pulses do not change relating to spectrograms measured by the instruments of optical pulse characterization 908 and 909, or a case where they are equivalent to time-spectrum properties obtained from spectrograms of all polarization components measured by the spectrogram measurement analyzing unit 907. In the second method, to be more specific, if time-spectrum properties of optical pulses obtained from the spectrogram measurement analyzing units 908 and 909 are different from each other, dispersion may not be compensated using the steps. In this case, a chromatic dispersion optical delay unit including a liquid crystal spatial light modulator described in the steps of chromatic dispersion compensation is used. In the liquid crystal spatial light modulator, polarization of each wavelength component can be changed. Using the characteristics, polarization is controlled in response to a wavelength, and then time-spectrum properties of optical pulses obtained from the spectrogram measurement analyzing units 908 and 909 are identified. After that, control by the quarter-wave plate and by the half-wave plate is performed.

Seventh Embodiment

Figure 21:
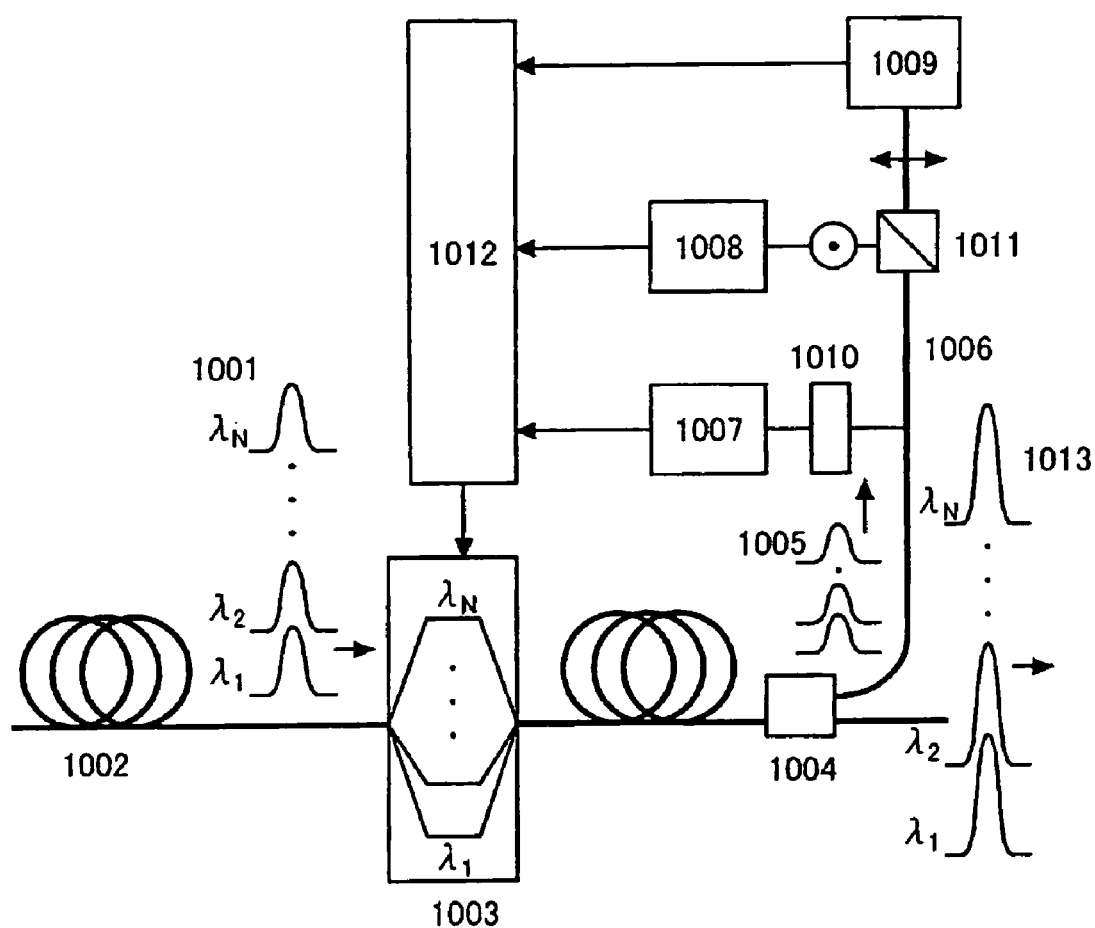
FIG. 21 is a diagram exemplifying a configuration, by which dispersion compensation or crosstalk elimination is performed in a wavelength-multiplexed optical fiber transmission system, according to a seventh embodiment of the present invention.

A configuration of a wavelength-multiplexed transmission system, by which dispersion is compensated, or crosstalk is eliminated, to decrease a signal error rate at the time of wavelength-multiplexed transmission will be described with reference to FIGS. 17 and 21. In this embodiment, dispersion also means chromatic dispersion or polarization mode dispersion. A wavelength-multiplexed optical pulse 1001 before dispersion compensation or crosstalk elimination propagates through a wavelength-multiplexed optical fiber transmission line 1002, which constitutes a target wavelength-multiplexed transmission system, from left to right. The wavelength-multiplexed optical pulse 1001 before dispersion compensation or crosstalk elimination is separated into wavelength channels by a dispersion compensator or a crosstalk eliminator 1003. After spectrum measurement, dispersion is compensated, or crosstalk is eliminated, independently for each channel. A wavelength multiplexed optical pulse for monitoring 1005 is extracted from a wavelength-multiplexed optical pulse monitoring port 1004, and is then distributed into three paths through an optical fiber for monitoring 1006, leading to spectrogram measurement analyzing units 1007 though 1009. If it is not necessary to compensate polarization mode dispersion, measuring all polarization components by the spectrogram measurement analyzing unit 1007 suffices. If further reduction in polarization dependency is required, a polarization eliminating element 1010 is used. When measuring polarization mode dispersion, the optical pulse is separated into linear polarization orthogonal to each other by a polarized beam splitter 1011. Then, each component is measured by the spectrogram measurement analyzing units 1008 and 1009. The measured spectrogram, or peak time-spectrum properties in the spectrogram, is transmitted to a polarization or crosstalk control unit 1012 as waveform data. Then, the result is given to a dispersion compensator or a crosstalk eliminator 1003 as feedback. As a result of the steps described above, there is no dispersion or no crosstalk in a wavelength-multiplexed optical pulse 1013 after dispersion compensation or crosstalk elimination.

For dispersion compensation, as the spectrogram measurement analyzing units 1007 through 1009, the configuration described in the fourth embodiment, shown in FIG. 17, is used. In addition, in this embodiment, feedback information is given to each wavelength channel of the dispersion compensator or the crosstalk eliminator 1003 to compensate dispersion, instead of giving the phase shift quantity or a polarization rotation angle, as feedback, to each wavelength component of the optical pulse, for which wavelength resolution has been performed by the dispersion compensator 903 in the sixth embodiment shown in FIGS. 9A and 9B. On the other points, the steps may be the same as those described in the sixth embodiment.

On the other hand, in the case of crosstalk elimination, when measuring a spectrogram, it is necessary to extract only one specific channel, which is different from the other, as an optical pulse to be measured and a gate optical pulse. Accordingly, in order to use the configuration in FIG. 17 for the spectrogram measurement analyzing unit 1007, what is required is that in the clock optical pulse extracting port 702, it is possible to select independently a wavelength channel which is extracted as an optical pulse to be measured and a clock optical pulse. For this purpose, the clock optical pulse extracting port 702 is required to be equipped with a wavelength tunable optical band-pass filter which is independent of the other, and which is used for an optical pulse to be measured and a clock optical pulse. Moreover, an optical pulse of the selected channel must be used as a gate optical pulse in the same state except intensity. However, the intensity may be amplified by the gate optical pulse generating unit 704. Thus, in a spectrogram measured by the spectrogram measurement analyzing unit 709, the following waveforms appear: a waveform of a channel component extracted as the optical pulse to be measured; and a waveform corresponding to an optical pulse caused by crosstalk of a channel component extracted as the optical pulse to be measured and a channel component extracted as the gate optical pulse. Feedback is performed so as to minimize the waveform.

As described above in detail, according to the present invention, applying two-photon absorption, or four-wave mixing, in a semiconductor to an optical gate enables realization of a polarization-independent optical pulse characterization instrument which measures, with high sensitivity, time and frequency properties of an optical pulse to be measured in an arbitrary polarized state.

The present invention can provide an optical transmission system, a signal error rate of which is low, and an instrument of optical pulse characterization which is useful for providing such an optical system.

While the invention has been described in its preferred embodiments, it is to be understood that the words which have been used are words of description rather than limitation and that changes within the purview of the appended claims may be made without departing from the true scope and spirit of the invention in its broader aspects.

Reference Numerals shown are as follows:
101 Optical pulse to be measured
102 Polarization independent beam splitter
103 Probe optical pulse 104 Gate optical pulse
105 Polarization independent roof retroreflector
106 Light intensity modulator
107 Light intensity modulator
108 Condenser lens
109 Two-photon transition medium
110 Collimation lens
111 Beam block
112 Transmitting probe optical pulse
113 Third optical pulse by four-wave mixing
114 Optical pulse to be measured
115 Polarized separation element
116 Condenser lens
117 Incident slit
118 Incidence side spherical mirror
119 Polarization independent diffraction grating
120 Emittance side spherical mirror
121 Rotating mirror
122 Emittance slit
123 Photodetector
124 Lock-in amplifier
125 Display/analyzing unit
201 Gate optical pulse
202 Probe optical pulse
203 Gate optical pulse
204 Probe optical pulse
205 Third optical pulse by four-wave mixing
301 Optical amplification area
401 Probe optical pulse
402 Gate optical pulse
403 Layer containing an optical amplification medium
404 Probe optical pulse
405 Gate optical pulse
406 Exciting light source
407 Exciting light
408 Layer containing an optical amplification medium
409 Probe optical pulse
410 Gate optical pulse
411 Exciting light source
412 Exciting light
413 Current injection source
414 Lead wire for current injection
501 Gate optical pulse
502 Probe optical pulse
503 Polarization independent roof retroreflector
504 Light intensity modulator
505 Light intensity modulator
506 Condenser lens
507 Two-photon transition medium
508 Collimation lens
509 Beam block
510 Transmitting probe optical pulse
511 Third optical pulse by four-wave mixing
512 Optical pulse to be measured
513 Polarized separation element
514 Condenser lens
515 Incident slit
516 Incidence side spherical mirror
517 Polarization independent diffraction grating
518 Emittance side spherical mirror
519 Rotating mirror
520 Emittance slit
521 Photodetector
522 Lock-in amplifier
523 Display/analyzing unit
601 Optical fiber transmission line
602 Optical amplifier
603 Optical fiber connecting unit
604 Spectrogram measurement analyzing unit
701 Wavelength-multiplexed optical fiber transmission line
702 Clock optical pulse extracting port
703 Clock optical pulse extracting optical fiber
704 Gate optical pulse generating unit
705 Gate optical pulse inputting optical fiber
706 Optical fiber connecting unit for gate optical pulse
707 Optical amplifier
708 Optical fiber connecting unit for optical pulse to be measured
709 Spectrogram measurement analyzing unit
801 Optical pulse to be measured
802 Optical frequency shifter
803 Reference optical pulse
804 Optical frequency shifter
805 Probe optical pulse
806 Gate optical pulse
807 Light intensity modulator
808 Polarization independent roof retroreflector
809 Polarization independent beam coupler
810 Condenser lens
811 Two-photon transition medium
812 Collimation lens
813 Polarization independent beam coupler
814 Photodetector
815 Band-pass filter
816 Phase controller
817 Polarization independent roof retroreflector for phase control
818 Chromatic dispersion unit
819 Photodetector
820 Band-pass filter
821 Lock-in amplifier
822 Display/analyzing unit
901 Optical pulse before dispersion compensation
902 Optical fiber transmission line
903 Dispersion compensator
904 Optical pulse monitoring port
905 Optical pulse for monitoring
906 Optical fiber for monitoring
907 Spectrogram measurement analyzing unit
908 Spectrogram measurement analyzing unit
909 Spectrogram measurement analyzing unit
910 Polarization eliminating element
911 Polarized beam splitter
912 Dispersion control unit
913 Optical pulse after dispersion compensation
1001 Wavelength-multiplexed optical pulse before dispersion compensation or crosstalk elimination
1002 Wavelength-multiplexed optical fiber transmission line
1003 Dispersion compensator or crosstalk eliminator
1004 Wavelength-multiplexed optical pulse monitoring port
1005 Wavelength multiplexed optical pulse for monitoring
1006 Optical fiber for monitoring
1007 Spectrogram measurement analyzing unit
1008 Spectrogram measurement analyzing unit
1009 Spectrogram measurement analyzing unit
1010 Polarization eliminating element
1011 Polarized beam splitter
1012 Dispersion control unit or crosstalk control unit
1013 Wavelength-multiplexed optical pulse after dispersion compensation or crosstalk elimination

What is claimed is:

1. An apparatus for adaptive optical communications, comprising:
   a compensator which receives an arbitrarily polarized optical pulse over an optical transmission line to modify characteristics of the optical pulse;
   at least one spectrogram measurement device coupled to the compensator for measuring the optical pulse, the spectrogram measurement device further comprising,
      an optical device which accepts the received optical pulse and a gate pulse, wherein the optical device transmittance is modified by two-photon absorption and four wave mixing, and further wherein the optical device produces an output probe pulse,
      a polarization-independent angle dispersion device optically coupled to the optical device, which performs spectral analysis on the output probe pulse, and
      an analysis device associated with the optical device which measures time-gated intensity and phase for the spectrally transformed output probe pulse to produce spectrogram information; and
   a control unit which receives the spectrogram information from the spectrogram measurement device and provides feedback to the compensator based upon the information to improve the optical pulse's characteristics.

2. The apparatus according to claim 1, wherein the compensator is at least one of a chromatic dispersion compensator and a polarization mode dispersion compensator.

3. The apparatus according to claim 1, wherein the spectrogram is based on frequency or wavelength.

4. An apparatus for adaptive optical communications, comprising:
   a compensator which receives wavelength multiplexed optical pulses over a optical transmission line;
   at least one spectrogram measurement device coupled to the compensator for measuring the multiplexed optical pulses, the spectrogram measurement device further comprising,
      an optical device which accepts the received multiplexed optical pulses and a gate pulse, wherein the optical device transmittance is modified by two-photon absorption and four wave mixing, and further wherein the optical device produces an output probe pulse,
      a polarization-independent angle dispersion device optically coupled to the optical device, which performs spectral analysis on the output probe pulse, and
      an analysis device associated with the optical device which measures time-gated intensity and phase for the spectrally transformed output probe pulse to produce spectrogram information; and
   a control unit which receives spectrogram information from the spectrogram measurement device and provides feedback to the compensator based upon the information to improve the optical pulse's characteristics.

5. The apparatus according to claim 4, wherein the compensator is at least one of a dispersion compensator and cross-talk eliminator.

6. The apparatus according to claim 5, wherein the dispersion compensator is at least one of a polarization dispersion compensator, chromatic dispersion compensator, and propagation time among wavelength multiplex channels compensator.

* * * * *